United States Patent [19]
Yoshida et al.

[11] Patent Number: 5,585,982
[45] Date of Patent: Dec. 17, 1996

[54] ROTARY DRUM APPARATUS WITH HEAD ROTATION LOCUS ADJUSTMENT ARRANGEMENT

[75] Inventors: Teruyuki Yoshida; Hideaki Kawada, both of Kanagawa; Seiichi Sakai, Tokyo; Hiroshi Iino, Kanagawa, all of Japan

[73] Assignee: Sony Corporation, Tokyo, Japan

[21] Appl. No.: 362,905

[22] Filed: Dec. 23, 1994

[30] Foreign Application Priority Data

Dec. 28, 1993 [JP] Japan .................................. 5-349556
Dec. 30, 1993 [JP] Japan .................................. 5-353311

[51] Int. Cl.⁶ ............................ G11B 5/52; G11B 5/56; G11B 5/027
[52] U.S. Cl. ........................... 360/107; 360/84; 360/109
[58] Field of Search ..................... 360/75, 77.16, 360/84, 130.24, 107, 109

[56] References Cited

U.S. PATENT DOCUMENTS

| 3,693,227 | 9/1972 | Maxey . | |
|---|---|---|---|
| 3,976,236 | 8/1976 | Catto | 226/50 |
| 4,989,110 | 1/1991 | Zevin et al. | 360/107 |
| 5,270,890 | 12/1993 | Katou et al. | 360/77.16 |
| 5,393,201 | 2/1995 | Okutani et al. | 417/16 |

FOREIGN PATENT DOCUMENTS 0328211  8/1989  European Pat. Off. .

*Primary Examiner*—Won Tae C. Kim
*Assistant Examiner*—Regina Y. Neal
*Attorney, Agent, or Firm*—Ronald P. Kananen

[57] ABSTRACT

The object of the present invention is to rotate a head with high precision along a predetermined rotation locus in a rotary drum apparatus for recording and/or reproducing predetermined signals on a tape recording medium. A locus of the head on the rotary drum connected to the first rotary shaft can be adjusted to coincide with the predetermined locus by dividing the rotary shaft into two shafts, and adjusting the two shafts with an adjustment mechanism. The adjustment mechanism can be in the form of threaded screws or electrical actuators. Sensors can be provided for measuring the horizontal degree and vertical degree of the rotary shaft holding material supporting the first rotary shaft for adjusting the two shafts using electrical actuators based on the measured results.

14 Claims, 19 Drawing Sheets

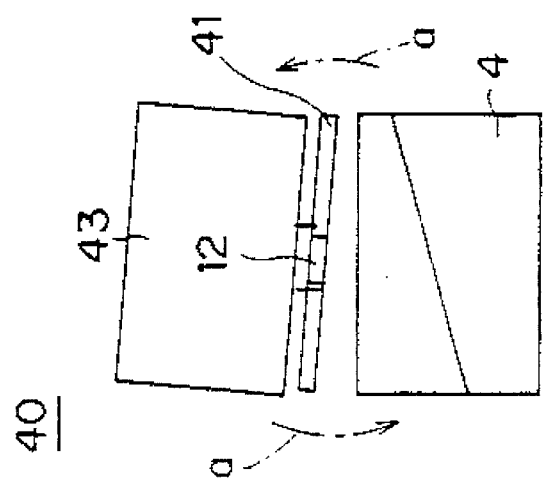
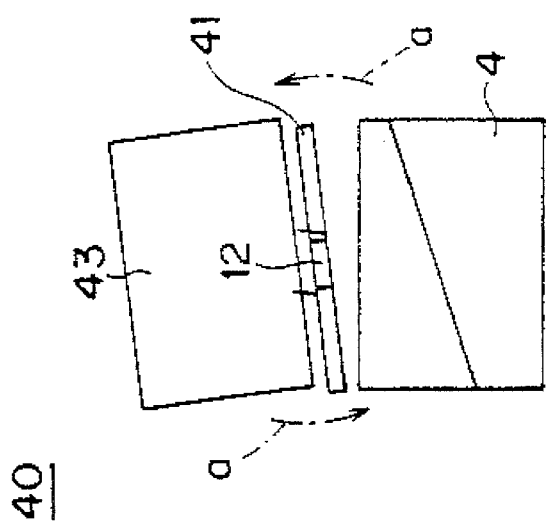
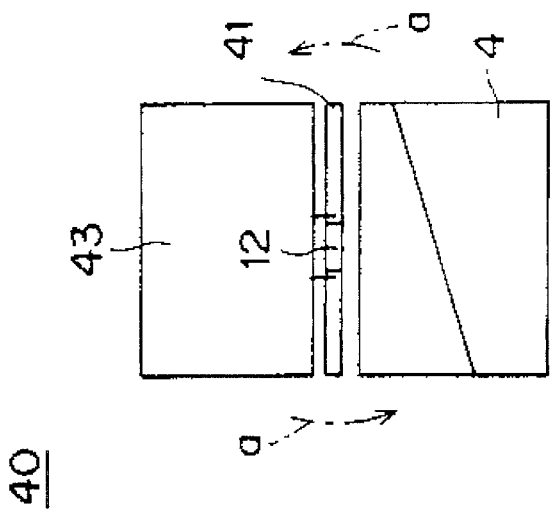

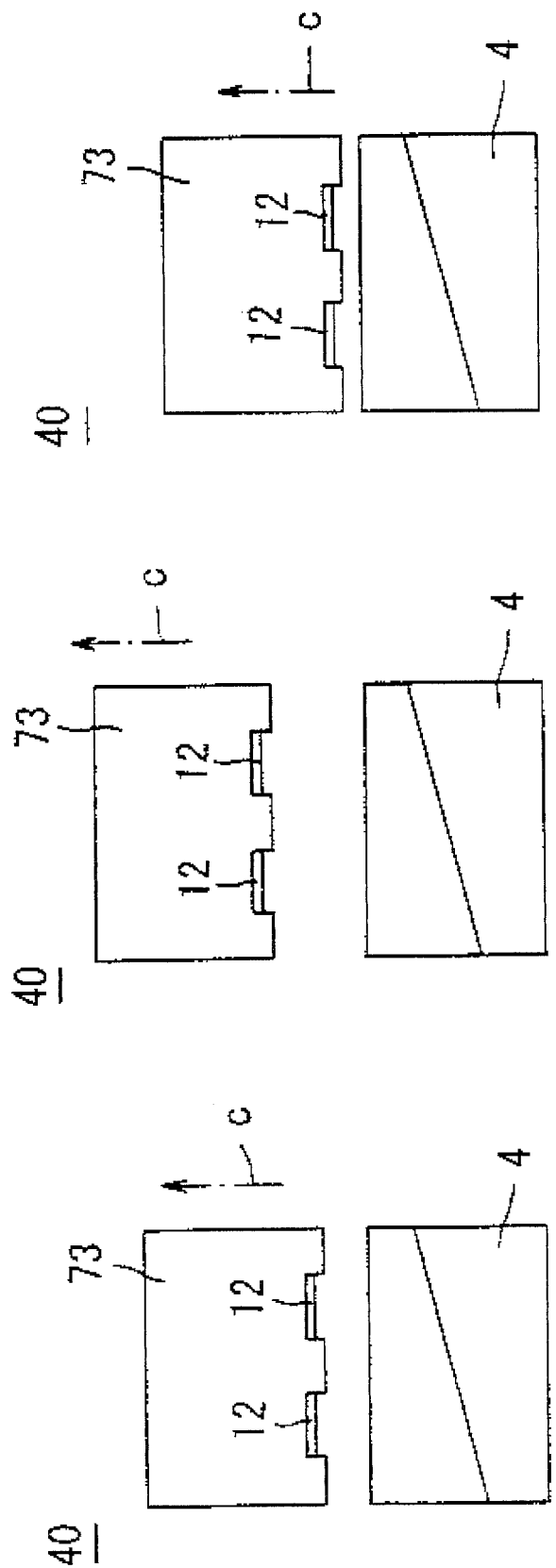

ROTARY DRUM APPARATUS WITH HEAD ROTATION LOCUS ADJUSTMENT ARRANGEMENT

BACKGROUND OF THE INVENTION

1. Field of the Invention

The present invention relates to a rotary drum apparatus and, in particular, to a rotary drum apparatus having a high precision head rotation locus.

2. Description of Related Art

A conventional video tape recorder records and/or reproduces predetermined video signals using a rotating magnetic head mounted on a rotary drum apparatus. The magnetic head forms recording tracks on a magnetic tape wound around the rotary drum apparatus. The recording tracks are formed on the magnetic tape sequentially and helically in relation to the longitudinal running direction of the magnetic tape.

FIGS. 1 and 2 illustrate a conventional central rotary drum apparatus 1 having a central rotary drum 11 that rotates between a cylindrical fixed upper drum 3 and a cylindrical fixed lower drum 4. The fixed upper drum 3 is connected to a support material 2 with screws 7A and 7B, and the cylindrical fixed lower drum 4 is connected to the support material 2 with screws 8A and 8B.

The central rotary drum 11 is supported in free rotation between the fixed upper drum 3 and fixed lower drum 4. A magnetic head 12 is fixed to the central rotary drum 11 projecting slightly from the outer circumference of the central rotary drum 11. The central rotary drum 11 is rotated by a drive motor 6 and, according to this rotation, the magnetic head 12 rotates between the fixed upper drum 3 and the fixed lower drum 4.

A magnetic tape (not shown) runs helically on the rotation locus of the magnetic head 12 fixed on the central rotary drum 11 along the outer circumference of the fixed upper drum 3 and fixed lower drum 4. The rotating magnetic head 12 can sequentially and helically form recording tracks in the longitudinal direction on the magnetic tape.

FIG. 3 is a sectional view of the conventional rotary drum apparatus 1 of FIGS. 1 and 2. As seen in this figure, a transformer frame 4A is formed at a lower side of the fixed lower drum 4, and a stator 13A of a rotary transformer 13 is fixed in the transformer frame 4A. In addition, a cylindrical bearing holder 4B is formed through the transformer frame 4A, and a rotary shaft 14 is supported in free rotation through bearings 15A and 15B held within the bearing holder 4B.

A flange 16 is engaged to the rotary shaft 14, and a rotor 13B of the rotary transformer 13 is fixed to a lower side of the flange 16. The central rotary drum 11 is fixed to an upper side of the flange 16. Thus, as a drive motor 6 mounted at a lower edge of the rotary shaft 14 rotates the rotary shaft 14, the rotor 13B of the rotary transformer 13 and the central rotary drum 11 are rotated.

A head base plate 21 is fastened on the outer circumference of the central rotary drum 11. The magnetic head 12 is fixed to the central rotary drum 11 through the head base plate 21. The height of the magnetic head 12 can be finely adjusted with an adjustment screw 22.

Thus, this rotary drum apparatus can record and/or reproduce predetermined video signals on the magnetic tape (not shown) by contacting the outer circumference of the magnetic head through an arrangement to make the magnetic head 12 project outside from the gap between the fixed upper drum 3 and the fixed lower drum 4.

Another conventional drum apparatus 30 is shown in side view in FIG. 4. This apparatus includes an upper rotary drum 33 rotatably mounted on a fixed lower drum 4. The upper rotary drum 33 is supported on the fixed lower drum 4 in free rotation. The magnetic head 12 is fixed to the upper rotary drum 33 and projects slightly from the outer circumference of the upper rotary drum 33. As the upper rotary drum 33 is rotated with a drive motor 6, the magnetic head 12 rotates firmly with the upper rotary drum 33.

A magnetic tape (not shown) runs helically on the rotation locus of the magnetic head 12 fixed on the upper rotary drum 33 along the outer circumference of the upper rotary drum 33 and the fixed lower drum 4. The rotating magnetic head 12 can sequentially and helically form recording tracks in the longitudinal direction on the magnetic tape.

FIG. 5 shows a sectional view of the rotary drum apparatus 30 of FIG. 4. As seen in this figure, a transformer frame 4A is formed at a lower side of the fixed lower drum 4, and a stator 13A of a rotary transformer 13 is fixed in the transformer frame 4A. In addition, a cylindrical bearing holder 4B is formed through the transformer frame 4A, and a rotary shaft 14 is supported in free rotation through bearings 15A and 15B held within the bearing holder 4B.

A flange 16 is engaged to the rotary shaft 14, and a rotor 13B of the rotary transformer 13 is fixed to a lower side of the flange 16. The upper rotary drum 33 is fixed to an upper side of the flange 16. Thus, as a drive motor 6 mounted at a lower edge of the rotary shaft 14 rotates the rotary shaft 14, the rotor 13B of the rotary transformer 13 and the upper rotary drum 33 are rotated.

A head base plate 21 is fastened on the outer circumference of the upper rotary drum 33. The magnetic head 12 is fixed to the upper rotary drum 33 through the head base plate 21. The height of the magnetic head 12 can be finely adjusted with an adjustment screw 22.

Thus, this rotary drum apparatus can record and/or reproduce predetermined video signals on the magnetic tape (not shown) by contacting the outer circumference of the magnetic head 12 through an arrangement to make the magnetic head 12 project outside from a gap between the upper rotary drum 33 and the fixed lower drum 4.

PROBLEMS TO BE SOLVED BY THE INVENTION

The rotary drum apparatus 1 having the structure shown in FIGS. 1 to 3 enables the magnetic head 12 to be adjusted by adjusting the entire central rotary drum 11 in relation to the flange 16.

In this case, the locus drawn by the magnetic head 12 fixed with the central rotary drum 11 is determined through the degree of perpendicularity (namely, the degree parallelism of the mounting surface 16A) of a mounting surface (an upper surface) 16A of the flange 16 to the rotary shaft 14 and the degree of parallelism of a mounting surface 11A of the central rotary drum 11. Because it was difficult for the locus to converge, for example, within several micrometers with relation to the vertical surface of the rotary shaft 14, it was difficult to attain high-density recording by narrowing the recording tracks formed on the magnetic tape because of the locus error of the magnetic head 12.

In addition, if a rotary drum apparatus has a plurality of magnetic heads 12 for a central rotary drum 11, an additional problem arises during the assembly process. For example, a plurality of magnetic heads 12 can be mounted on the central rotary drum 11 opposed 180 degrees from each other. In this case, the operator typically mounts the central rotary drum 11 on a jig flange (not shown) for assembly, the jig flange having substantially the same structure as the flange 16.

In assembly, the operator performs an adjustment to make the loci of the plurality of magnetic heads 12 converge within a plane parallel to the mounting surface of the jig flange (surface similar to the mounting surface 16A of the flange 16). However, if the parallelism of the mounting surface of the jig flange is slightly different than the parallelism of the mounting surface 16A of the flange 16, there was a problem in that the loci of the magnetic heads 12 fixed to the central rotary drum 11 did not converge, for example, within several micrometers with relation to the vertical plane of the rotary shaft 14.

The rotary drum apparatus 30 shown in FIGS. 4 and 5 enables the magnetic head 12 to be replaced by replacing the entire upper rotary drum 33 in relation to the flange 16. Also in this case, the locus precision of the magnetic head 12 is determined through the parallelism of the mounting surface 16A of the flange 16 and the parallelism of the upper rotary drum 33, in addition to the parallelism of the jig flange in assembling a plurality of magnetic heads 12. Thus, it was difficult for the locus to converge within several micrometers with relation to a plane.

Furthermore, it was another problem that the structure of the magnetic head was complicated if it was designed to change the height of the magnetic head 12 based on the tape speed. The magnetic head structure in this case was designed in a dynamic tracking head structure made of bimorphs, and so forth, to allow slow reproducing or double-speed reproducing with the changing magnetic tape speed.

Considering the above points, the present invention proposes a rotary drum apparatus capable of rotating a head along a predetermined rotation locus with high precision.

SUMMARY OF THE INVENTION

The object of the present invention is to rotate a head with high precision along a predetermined rotation locus in a rotary drum apparatus for recording and/or reproducing predetermined signals on a tape recording medium.

Additional objects, advantages and novel features of the invention will be set forth in the description which follows, and will become apparent to those skilled in the art upon reading this description or practicing the invention. The objects and advantages of the invention may be realized and attained by the appended claims.

To achieve the foregoing and other objects and in accordance with the purpose of the present invention, as embodied and broadly described herein, the device according to this invention comprises a rotary drum apparatus 40, 70, 140 that records and/or reproduces predetermined signals on a tape recording medium through the rotation of a head 12 fixed on a rotary drum 41, 73, the rotary drum apparatus comprising a support material 42, 142 fastening a first rotary shaft holding material 43, 71, and a second rotary shaft holding material 4; a first rotary shaft 44 supported in free rotation by the first rotary shaft holding material 43, 71; a second rotary shaft 14 supported in free rotation by the second rotary shaft holding material 4 and being divided in relation to the first rotary shaft 44; a synchronization means 47 for causing the rotation of the first rotary shaft 44 to coincide with the rotation of the second rotary shaft 14; the rotary drum 41, 73 being fixed to the first rotary shaft 44 and supporting the head 12; and an adjustment means 42, 42A, 42B, 42C, 42D, 52, 53, 57A, 57B, 142, 142A, 142B, 142C, 142D, 152, 157A, 157B, 175 for adjusting a horizontal and vertical displacement degree of the first rotary shaft holding material 43, 71 for adjusting the rotation locus of the head 12.

In addition, the synchronization means 47 comprises a flexible joint connecting the first rotary shaft 44 and the second rotary shaft 14.

Furthermore, in the present invention, the adjustment means: vertically adjusts the displacement of the first rotary shaft holding material 43, 71 by dividing the support material 42, 142 into a first block 42E, 42G, 142E 142G fastening the first rotary shaft holding material 43, 71 and a second block 42F, 142F fastening the second rotary shaft holding material 4 with a first slit 42D, 142D formed in a direction vertical to a surface formed with the rotation locus of the head 12, and changing the gap of the first slit 42D, 142D; and horizontally adjusts the inclination of the first rotary shaft holding material 43, 71 by dividing the support material 42, 142 into a first block 42E, 142E fastening the first rotary shaft holding material 43, 71 and a second block 42F, 42G, 142F, 142G fastening the second rotary shaft holding material 4 with a second slit 42C, 142C formed in a direction horizontal to a surface formed with the rotation locus of the head 12, and changing the gap of the second slit 42C, 142C. The adjustment means can comprise threaded screws 52, 53, 57A, 57B or electric actuators. The electric actuators can include a first actuator 152 for vertical adjustment and second actuators 157A and 157B for horizontal adjustment.

In the case of replacing the head 12, it is possible to make the rotation loci coincide before and after replacement by replacing the rotary drum 41, 73 fixed to the first rotary shaft 44 with the entire rotary shaft holding material 43, 71.

Furthermore, in the present invention, the adjustment means 175 adjusts the horizontal displacement degree of the rotary shaft holding material 43 to make two measured results coincide through inputting measured results of a first 171A and a second 171B distance sensor for measuring the horizontal displacement degree of the first rotary shaft holding material 43 among the measuring means 171A, 171B, 171C, and also adjusts the vertical displacement degree of the first rotary shaft holding material 43 to make two measured results coincide through inputting measured results of the first 171A and a third distance 171C sensor for measuring the vertical displacement degree of the first rotary shaft holding material 43 among the measuring means 171A, 171B, 171C.

Moreover, variable-speed reproducing in relation to a tape recording medium can be easily performed by inclining the rotation locus of the head 12 in an optional direction using the adjustment means 175.

BRIEF DESCRIPTION OF THE DRAWINGS

The present invention will become more clearly appreciated as the disclosure of the present invention is made with reference to the accompanying drawings wherein:

FIG. 9 is a schematic diagram describing the azimuth adjustment of a magnetic head locus in the first embodiment;

FIG. 12 is a schematic diagram describing the vertical adjustment of a magnetic head locus in the second embodiment;

DETAILED DESCRIPTION OF THE INVENTION

Figure 1:
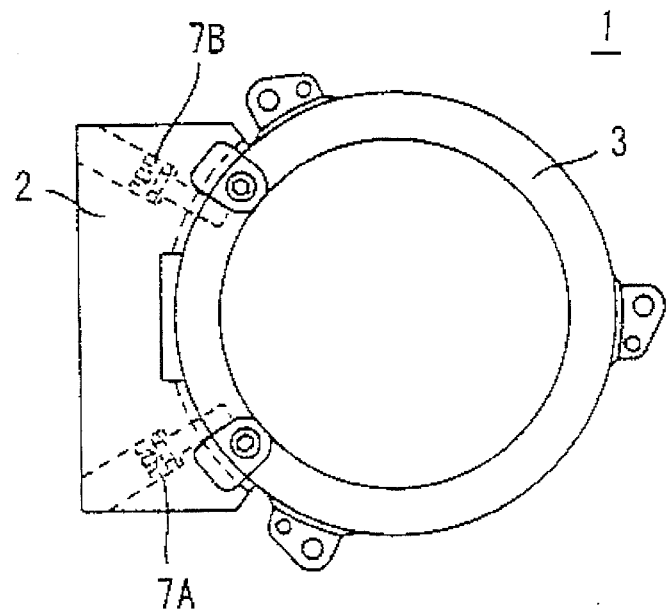
FIG. 1 is a top view of a conventional central rotary drum apparatus.
Figure 2:
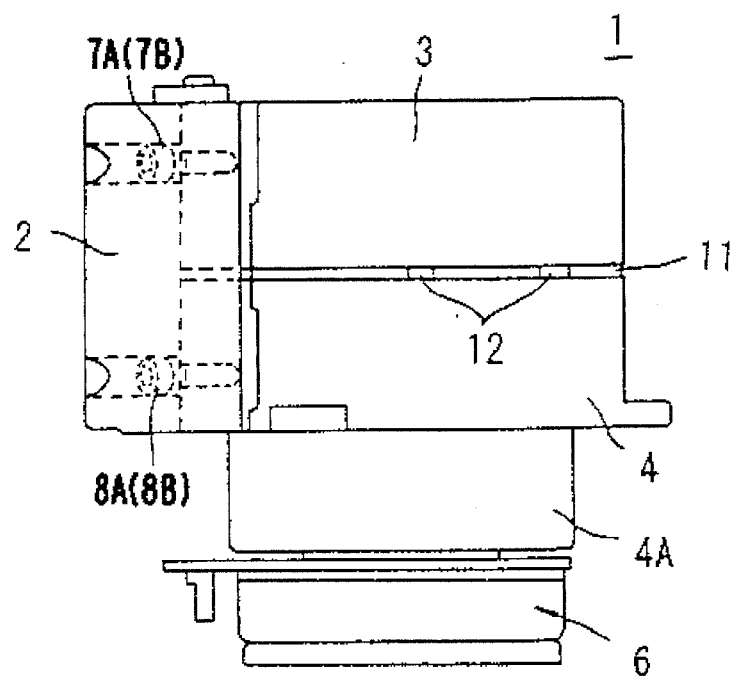
FIG. 2 is a side view of the conventional central rotary drum apparatus of FIG. 1.
Figure 3:
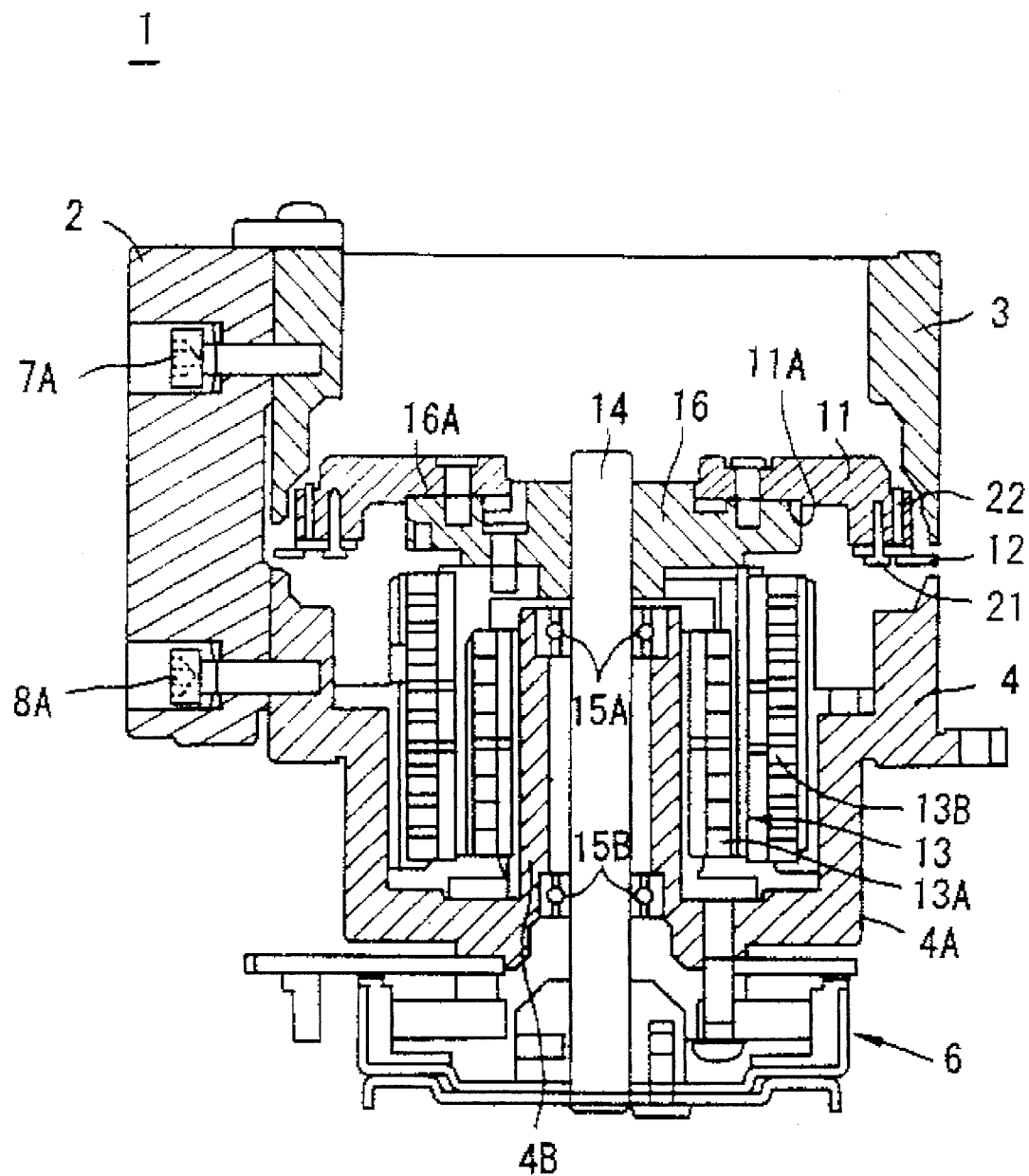
FIG. 3 is a sectional view of the conventional central rotary drum apparatus of FIG. 1.
Figure 4:
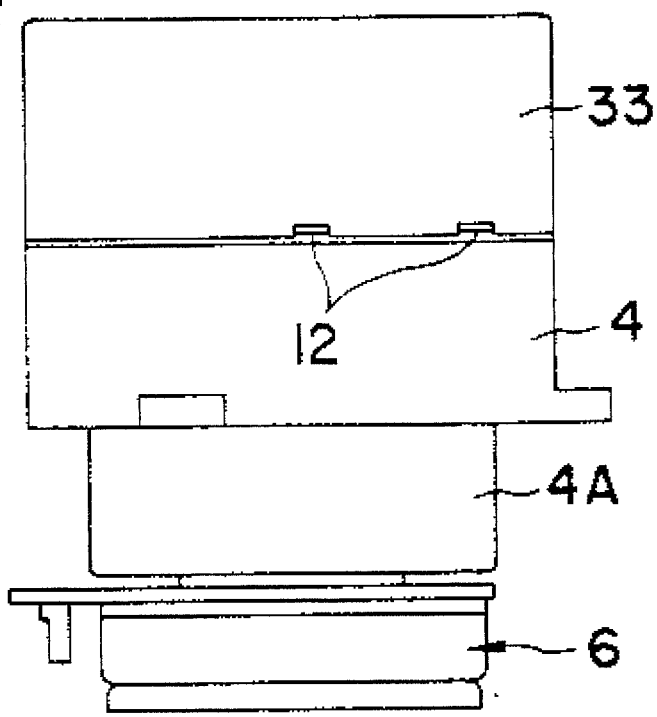
FIG. 4 is a side view of a conventional upper rotary drum apparatus.
Figure 5:
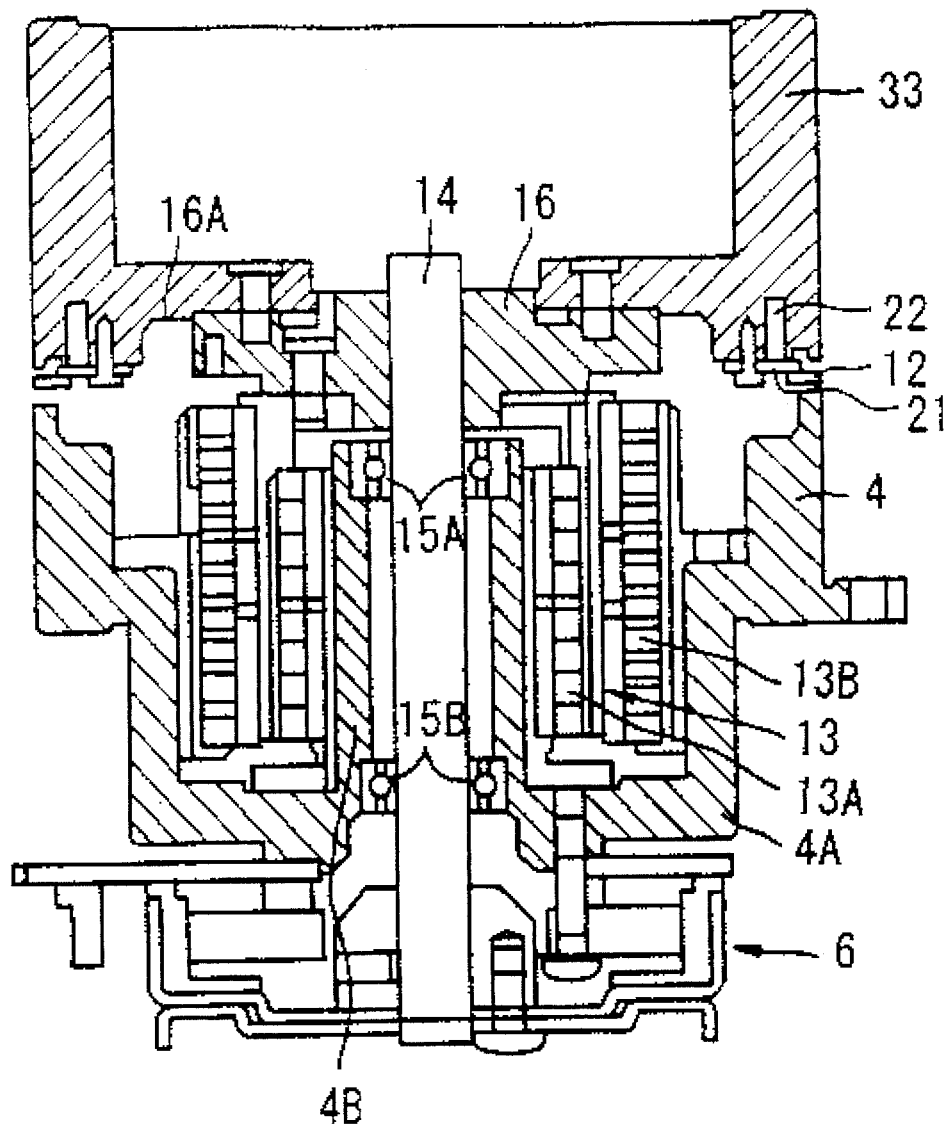
FIG. 5 is a sectional view of the conventional upper rotary drum apparatus of FIG. 4.

Reference will now be made in detail to the preferred embodiments of the invention, examples of which are illustrated in the accompanying drawings. For clarity, like reference numerals have been used to refer to like elements throughout the drawings.

Figure 6:
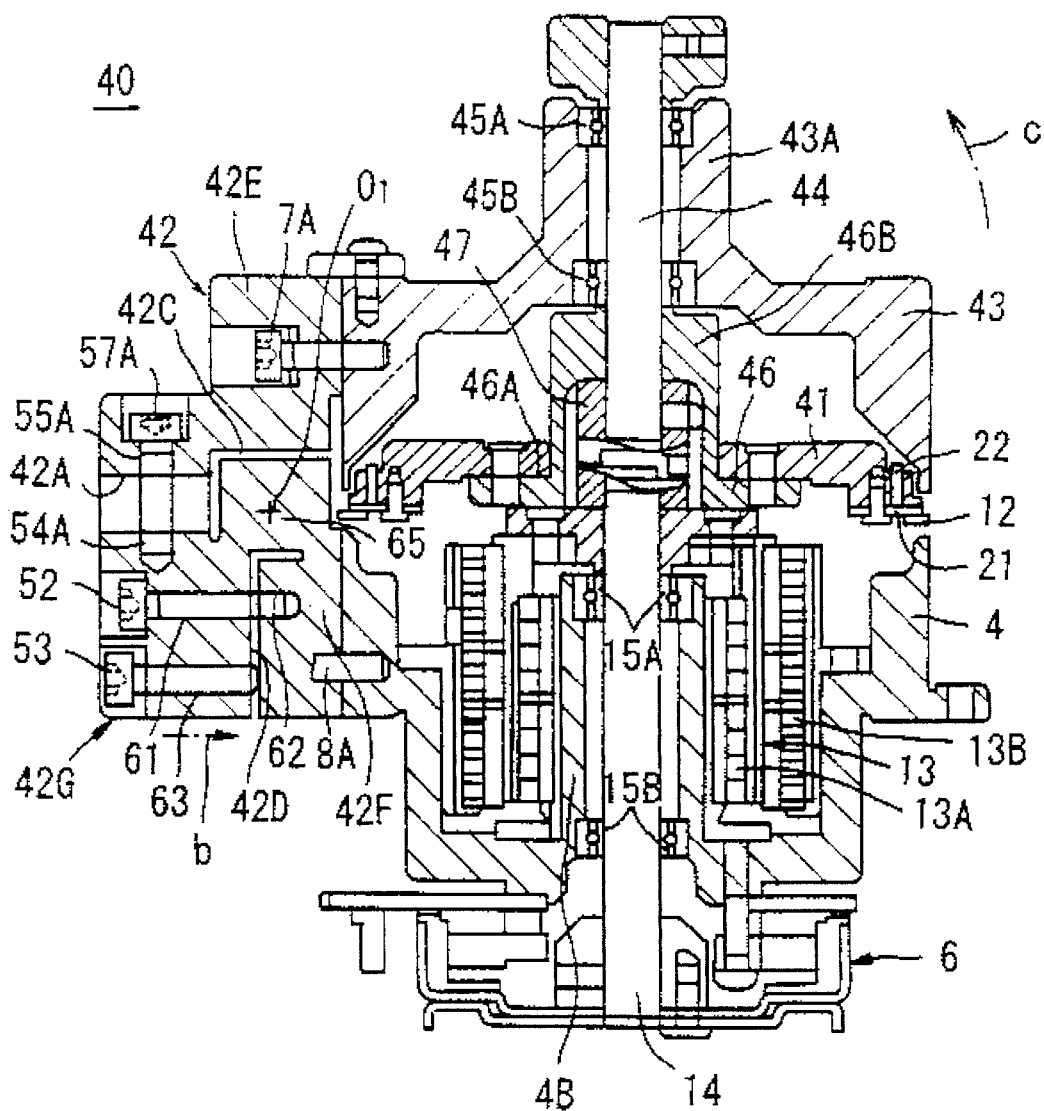
FIG. 6 is a sectional view of a central rotary drum apparatus according to a first embodiment of the present invention.

FIGS. 6 to 10 illustrate a central rotary drum apparatus 40 according to a first embodiment of the present invention. In FIG. 6, a fixed upper drum 43 is fastened to a support material arrangement 42 with a screw 7A. A cylindrical bearing holder 43A is formed in the fixed upper drum 43, and a rotary shaft 44 is supported in free rotation through bearings 45A and 45B held within the bearing holder 43A.

A cylindrical engagement 46B formed at the center of a flange 46 is engaged at a lower edge of the rotary shaft 44. A central rotary drum 41 is fixed on a mounting surface (upper side surface) 46A of the flange 46. In addition, a head base plate 21 is fastened to the outer circumference of the central rotary drum 41. A magnetic head 12 is fixed to the central rotary drum 41 through the head base plate 21. The height of the magnetic head 12 can be finely adjusted with an adjustment screw 22.

The magnetic head 12 of the central rotary drum 41 can rotate with the rotary shaft 44 in one piece. The rotary shaft 44 located in the fixed upper drum 43 and a rotary shaft 14 located in a fixed lower drum 4 are connected with a flexible joint 47, so the drive motor 6 firmly rotates not only the rotary shaft 14 but also the rotary shaft 44. Thus, the drive motor 6 can rotate the rotary shaft 14 and 44 and the magnetic head 12 through the central rotary drum 41.

Figure 7:
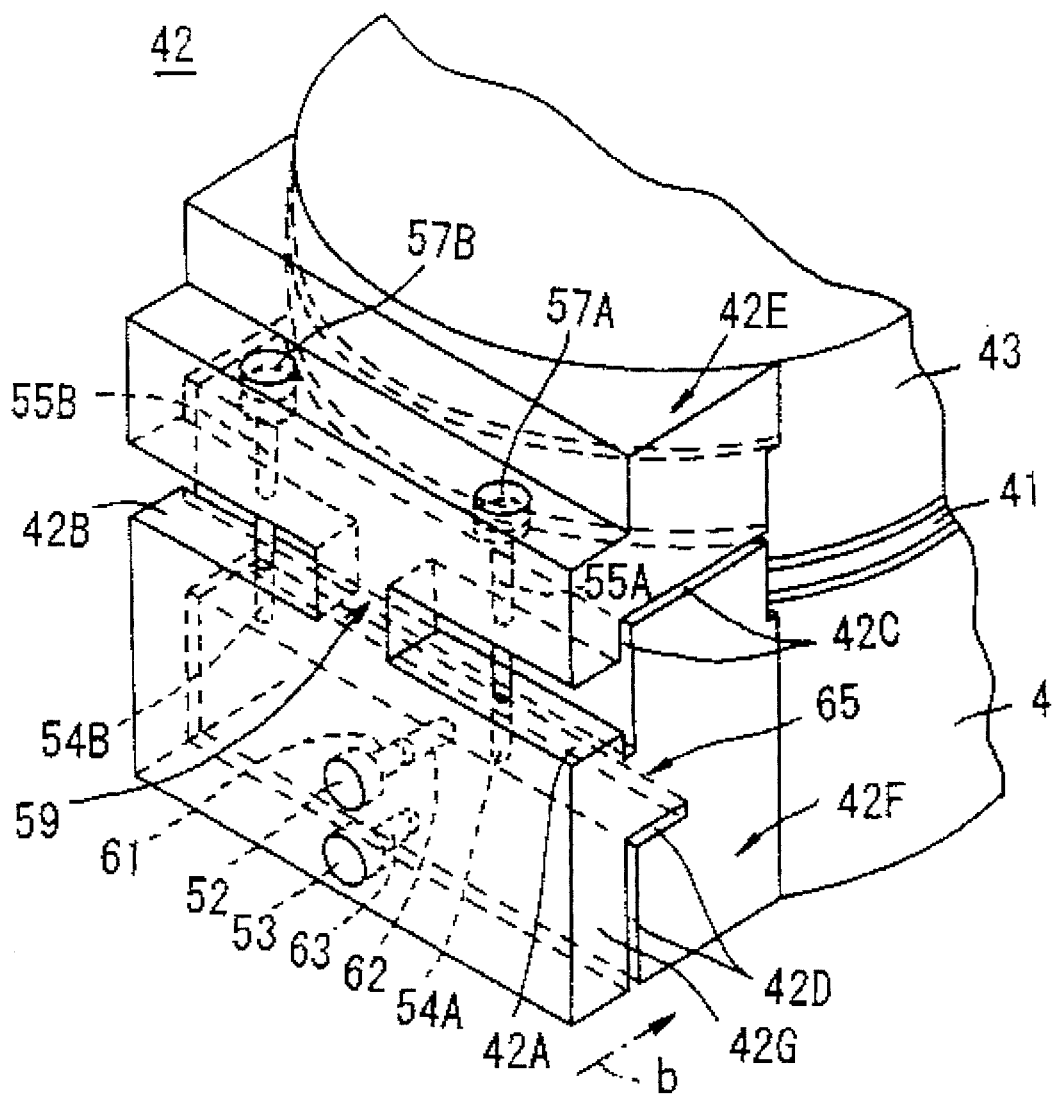
FIG. 7 is a perspective view of the central rotary drum apparatus of FIG. 6 showing the structure of a support material.

Two slits 42C and 42D are formed in a support material 42 supporting the fixed upper drum 43 and the fixed lower drum 4. Additionally, as shown in FIG. 7, notches 42A and 42B are formed through the slit 42C.

Thus, the support material 42 is divided into an upper drum fixing block or support member 42E supporting the fixed upper drum 43 and a lower drum fixing block or support member 42F supporting the fixed lower drum 4. The upper drum fixing block 42E and the lower drum fixing block 42F are connected through a connection 59 formed between notches 42A and 42B.

A screw hole 54A is formed vertically at the bottom of the notch 42A. A play engagement hole 55A, whose diameter is larger than that of a screw 57A and smaller than that of the screw head, is formed through the ceiling of the notch 42A. In addition, a screw hole 54B is formed vertically at the bottom of the notch 42B, and a play engagement hole 55B, whose diameter is larger than that of a screw 57B and smaller than that of the screw head, is formed through the ceiling of the notch 42B.

Figure 8:
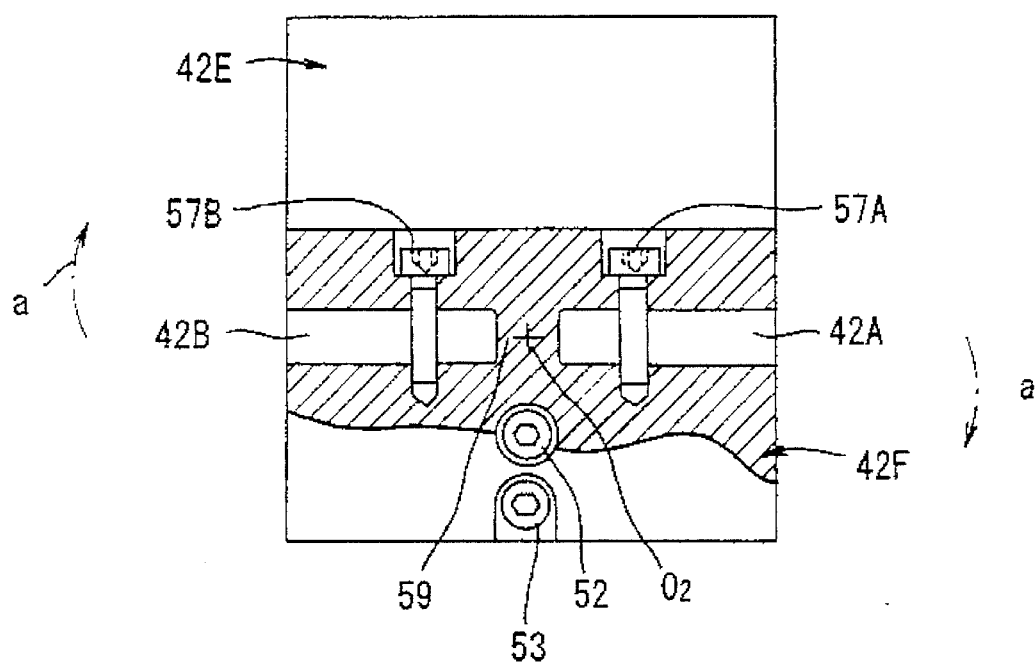
FIG. 8 is a side view of the central rotary drum apparatus of FIG. 6 showing the structure of the support material.

Thus, on the one hand, as shown in FIG. 8, the upper drum fixing block 42E inclines in the direction of arrows "a" centering the fulcrum $0_2$ of the connection 59, by loosely engaging the screw 57A in the play engagement hole 55A, inserting the screw 57A into the screw hole 54A, loosely engaging the screw 57B in the play engagement hole 55B, inserting the screw 57B into the screw hole 54B, and fastening the screw 57A and unfastening the screw 57B.

On the other hand, the upper drum fixing block 42E inclines (viz., flexes slightly) in the direction opposite to the arrows "a" centering the fulcrum $0_2$ of the connection 59, by fastening the screw 57B and unfastening the screw 57A.

Consequently, as shown in FIG. 9, where the support material 42 in FIG. 8 is seen as the central rotary drum apparatus 40 from the back, if the screws 57A and 57B incline the upper drum fixing block 42E (FIG. 8) in the direction of the arrow "a" from a horizontal state of the fixed upper drum 43 (FIG. 9(A)), the fixed upper drum 43 fixed to the fixing block 42E inclines in the direction of the arrow "a" (FIG. 9(B)). Thus, the central rotary drum 41 unified with the rotary shaft 44 of the fixed upper drum 43 (FIG. 6) also inclines in the direction of the arrow "a" with the fixed upper drum 43. Consequently, the locus of the magnetic head 12 fixed to the rotary drum 41 can be inclined in relation to a magnetic tape (not shown) contacting the outer circumference of the fixed upper drum 43 and the fixed lower drum 4.

In addition, if the screws 57A and 57B incline the upper drum fixing block 42E (FIG. 8) in the direction opposite to the arrow "a," the fixed upper drum 43 fixed to the fixing block 42E inclines in the direction opposite to the arrow "a" (FIG. 9(C)). Thus, the central rotary drum 41 unified with the rotary shaft 44 of the fixed upper drum 43 (FIG. 6)

inclines in the direction opposite to the arrow "a" with the fixed upper drum 43. Consequently, the locus of the magnetic head 12 fixed to the central rotary drum 41 can be inclined in relation to a magnetic tape (not shown) contacting the outer circumference of the fixed upper drum 43 and the fixed lower drum 4.

The locus of the magnetic head 12 in relation to the magnetic tape can be inclined in the azimuth direction by adjusting the length of the screw 57A and the screw 57B (FIG. 8) in the manner described above. Incidentally, this adjustment in the azimuth direction is also called adjustment of the horizontal degree.

Furthermore, in FIG. 7, the support material 42 is divided into a lower drum fixing block 42F supporting the fixed lower drum 4 and a vertical adjustment block 42G connected to an upper drum fixing block 42E supporting the fixed upper drum 43 with the vertical slit 42D through the connection 65.

A play engagement hole 61, whose diameter is larger than that of a screw 53 and smaller than that of the screw head, is formed horizontally through the vertical adjustment block 42G. A screw hole 62 is formed at the position opposite to the play engagement hole 61 in the lower drum fixing block 42F. Thus, the vertical adjustment block 42G can be displaced in the closer direction (the direction of an arrow "b") in relation to the lower drum fixing block 42F, by loosely engaging the screw 52 in the play engagement hole 61, and loosely engaging the screw 52 in the play engagement hole 62.

Furthermore, a screw hole 63 is formed in parallel with the play engagement hole 61 under the hole 61 through the vertical adjustment block 42G. The vertical adjustment block 42G can be displaced in the more distant direction (the direction opposite to the arrow "b") by inserting the screw 53 into the screw hole 63 and further fastening the screw 53 contacting a slit surface of the lower drum fixing block 42F through the slit 42D.

Thus, on the one hand, if the vertical adjustment block 42G is displaced in the direction of the arrow "b" in relation to the lower drum fixing block 42F by unfastening the screw 53 and fastening the screw 52, as shown in FIG. 6, the fixed upper drum 43 can be displaced through the upper drum fixing block 42E connected to the vertical adjustment block 42G. The displacement direction of the fixed upper drum 43 is in the direction of the arrow "c" centering the fulcrum $0_1$ of the connection 65 of the support material 42.

On the other hand, if the vertical adjustment block 42G is displaced in the direction opposite to the arrow "b" in relation to the lower drum fixing block 42F by unfastening the screw 52 and fastening the screw 53, the fixed upper drum 43 can be displaced through the upper drum fixing block 42E connected to the vertical adjustment block 42G. The displacement direction of the fixed upper drum 43 is the direction opposite to the arrow "c" centering the fulcrum $0_1$ of the connection 65 of the support material 42.

Figure 10C:
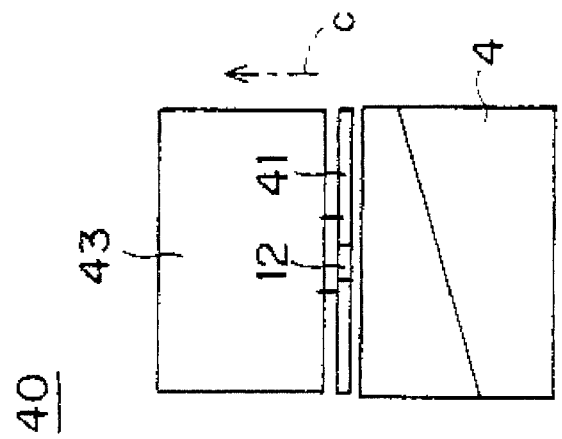
FIG. 10 is a schematic diagram describing the vertical adjustment of a magnetic head locus in the first embodiment.
Figure 10B:
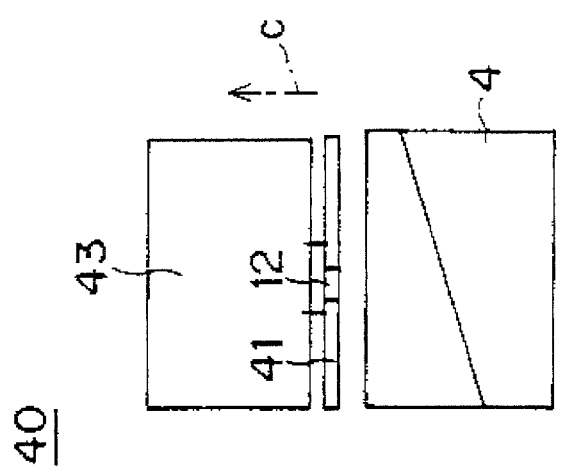
Figure 10A:
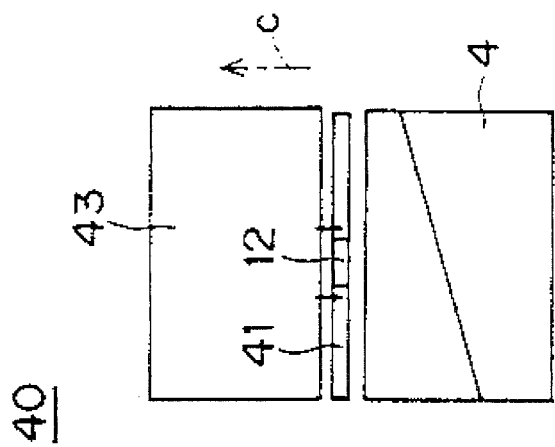

As shown in FIG. 10, where the support material 42 in FIG. 8 is seen as the rotary drum apparatus 40 from the back, if the fixed upper drum 43 is displaced in the direction of the arrow "c" (FIG. 10(B)) by the screws 52 and 53 in a horizontal state (FIG. 10(A)), the central rotary drum 41 unified with the rotary shaft 44 of the fixed upper drum 43 (FIG. 6) inclines in the direction of the arrow "c". Consequently, the locus of the magnetic head 12 fixed to the central rotary drum 41 can be inclined upward in relation to a magnetic tape (not shown) contacting the outer circumference of the fixed upper drum 43 and the fixed lower drum 4.

Furthermore, if the fixed upper drum 43 is displaced in the direction opposite to the arrow "c" (FIG. 10(C)) through the screws 52 and 53 in the horizontal state (FIG. 10(AA)), the central rotary drum 41 unified with the rotary shaft 44 of the fixed upper drum 43 (FIG. 6) inclines in the direction opposite to the arrow "c" with the fixed upper drum 43. Consequently, the locus of the magnetic head 12 fixed to the central rotary drum 41 can be inclined downward in relation to a magnetic tape (not shown) contacting the outer circumference of the fixed upper drum 43 and the fixed lower drum 4.

The locus of the magnetic head 12 can be moved upward and downward (vertical direction) in parallel in relation to the magnetic tape by adjusting the length of the screws 52 and 53 (FIG. 6). Incidentally, this adjustment in the upward direction is also called adjustment of the vertical displacement degree.

In the above-described structure of the rotary drum apparatus 40, the rotary shaft 44 supported with the fixed upper drum 43 and the rotary shaft 14 supported with the fixed lower drum 4 are divided, and the central rotary drum 41 is fixed to the rotary shaft 44 supported with the fixed upper drum 43.

Thus, in the case of replacing the magnetic head 12, the central rotary drum 41 is replaced in conjunction with the fixed upper drum 43. At this time, the rotary drum apparatus is assembled so that the degree of parallelism of the mounting surface 46A of the flange 46 fixed to the rotary shaft 44 and of the mounting surface of the central rotary drum 41 in relation to the flange 46 converges within a predetermined allowance. Thus, the locus error of the magnetic head 12 in relation to the fixed upper drum 43 also converges within a predetermined allowance.

The present invention can eliminate the assembly error between the flange 46 and the central rotary drum 41 in the case of assembling the central rotary drum 41 to the flange 46, through fastening the fixed upper drum 43 along with the central rotary drum 41 to a support material 42 beforehand.

Furthermore, when a rotary drum apparatus having a central rotary drum 41 with a plurality of magnetic heads 12, for example, two heads on opposite sides, is assembled, an operator can adjust the magnetic heads to have the same locus. This adjustment is done in mounting the central rotary drum 41 on the fixed upper drum 43 through the flange 46 of the rotary shaft 44.

Thus, an operator can adjust the loci of a plurality of magnetic heads 12 in assembling the fixed upper drum 43, rotary shaft 44, flange 46, and the central rotary drum 41 into a single piece. Consequently, because the magnetic head 12 is replaced with a replacement piece assembled with the fixed upper drum 43, rotary shaft 44, flange 46, and central rotary drum 41, the present invention can eliminate the process where the central rotary drum 41 is mounted on the flange 46. Hence, an operator can replace the magnetic head 12 under conditions where the loci of the plurality of magnetic heads 12 are guaranteed.

If an assembly error occurs due to dirt when the fixed upper drum 43 is fastened to the support material 42, an operator can vertically adjust displacement of the fixed upper drum 43 and the central rotary drum 41 with the screws 52 and 53. An operator can also adjust displacement of the fixed upper drum 43 and the central rotary drum 41 in the direction of the azimuth with the screws 57A and 57B.

Thus, when fastening the replacement part composed of the fixed upper drum 43, rotary shaft 44, flange 46, and central rotary drum 41 to the support material 42, an operator can cause the locus of the magnetic head 12 to coincide with the predetermined locus by adjusting the vertical displacement with the screws 52 and 53, and the azimuth displacement with the screws 57A and 57B.

According to the above structure, this apparatus enables the locus of the magnetic head 12 after replacement to coincide with the locus before replacement with high precision. The high precision is attained by replacing the magnetic head 12 in conjunction with the fixed upper drum 43 fastened in the support material 42 and the central rotary drum 41 unified in the fixed upper drum 43. The precision is also attained by adjusting the rotation locus of the magnetic head 12 fixed in the central rotary drum 41 with the screws 52, 53, 57A, and 57B of the support material 42.

Hence, this apparatus enables replacement of the magnetic head 12 easily while ensuring the compatibility of the locus of the magnetic head 12 even in a rotary drum apparatus performing high-density recording and/or reproducing, such as forming recording tracks only several microns wide on a magnetic tape. Such high-density recording/reproducing capability is especially important where long recording/reproducing times are necessary and/or where magnetic tape of a limited length is to be used. This might occur, for example, in apparatus for recording data from satellites, and so forth.

Although the above embodiment of the present invention is described with relation to a central rotary drum apparatus 40, the present invention can be also applied to an upper rotary drum apparatus with a rotating upper drum. Thus, in FIGS. 11 to 13, an upper rotary drum apparatus 70 is shown according to a second embodiment of the present invention.

Figure 11:
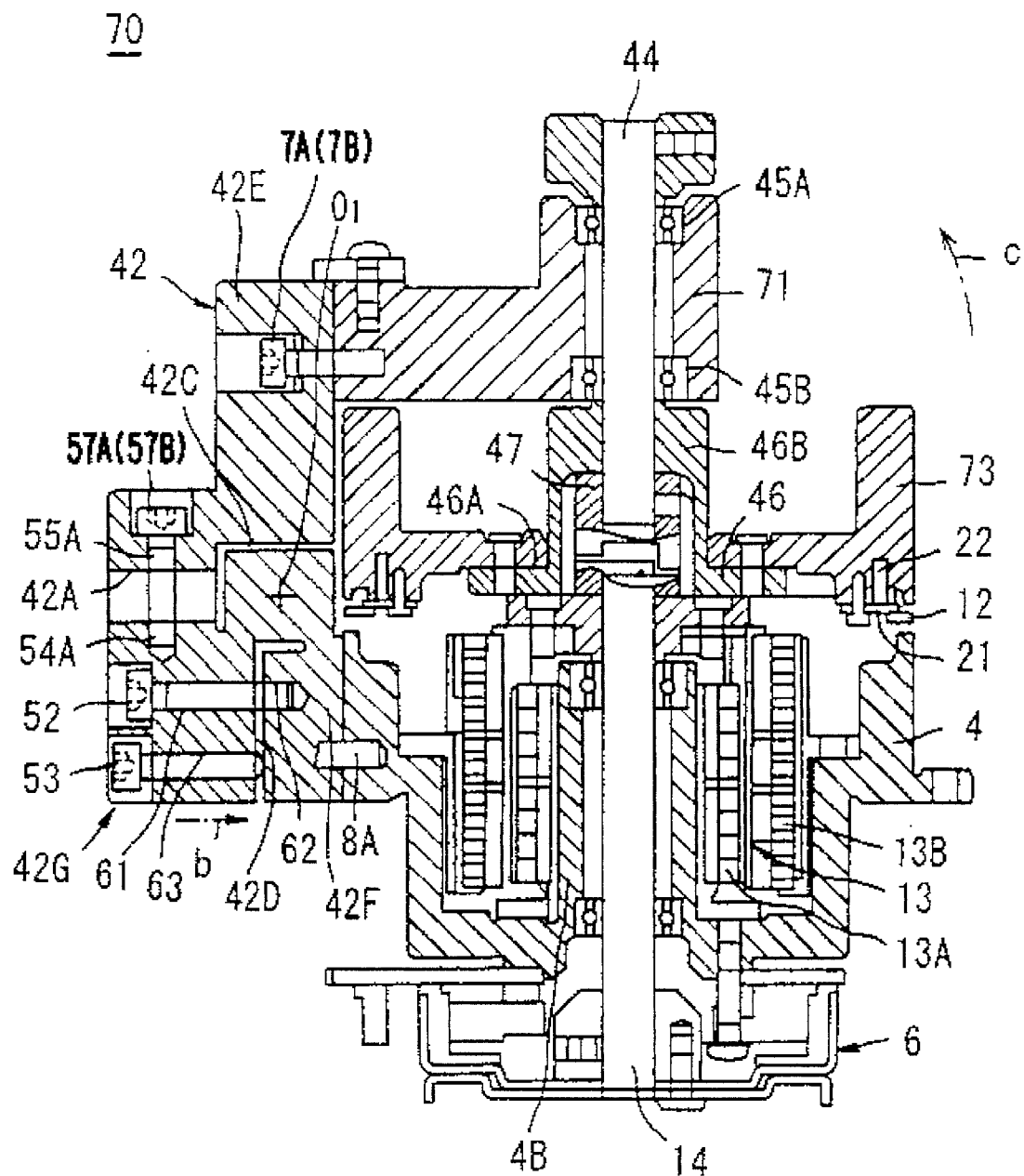
FIG. 11 is a sectional view of an upper rotary drum apparatus according to a second embodiment of the present invention.

In FIG. 11, the upper rotary drum apparatus 70 includes an upper rotary drum 73, a rotary shaft holding material 71 fastened to the support material 42 with screws 7A and 7B, and a rotary shaft 44 supported in free rotation to a rotary shaft holding material 71 through bearings 45A and 45B.

The upper rotary drum 73 is engaged to the rotary shaft 44, and the magnetic head 12 is fixed through a head base plate 21 to the upper rotary drum 73. Displacement of the magnetic head 12 can be adjusted vertically with the length of a screw 22.

In addition, the lower edge of the rotary shaft 44 is connected through a flexible joint 47 to the rotary shaft 14 supported within the fixed lower drum 4. Thus, a drive motor 6 rotates not only the rotary shaft 14 but also the rotary shaft 44 through the flexible joint 47. Consequently, the drive motor can rotate the upper rotary drum 73.

Figures 13A, 13B, 13C:
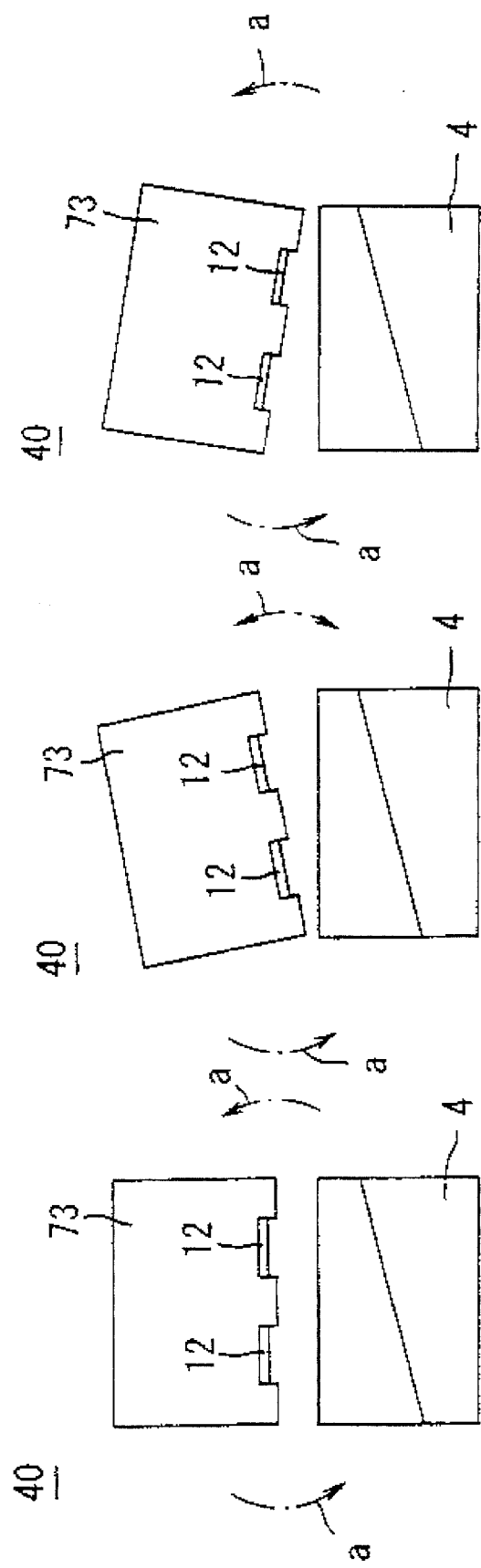
FIG. 13 is a schematic diagram describing the azimuth adjustment of a magnetic head locus in the second embodiment.

The rotary drum apparatus 70 of FIG. 11 having the magnetic head 12 fixed to the upper rotary drum 73 has the support material 42 in the same structure as in FIG. 6. The upper rotary drum 73 can be displaced-with screws 52 and 53 of the support material 42 in a direction the same as or opposite to the direction of the arrow "c" for centering the fulcrum $0_1$. Vertical adjustment of the magnetic head 12 can be done as shown in FIGS. 12(A), (B), and (C). The inclination of the upper rotary drum 73 can be also done with the screws 57A and 57B of the support material 42 in a direction the same as or opposite to the direction of the arrow "a" for centering the fulcrum $0_2$ (FIG. 8). Azimuth adjustment of the magnetic head 12 can be done as shown in FIGS. 13(A), (B), and (C).

FIGS. 14 to 21 illustrate a central rotary drum apparatus 140 according to a third embodiment of the present invention. Several elements of this embodiment are identical to the embodiment of FIGS. 6 to 10 and, therefore, will not be described in detail.

Figure 14:
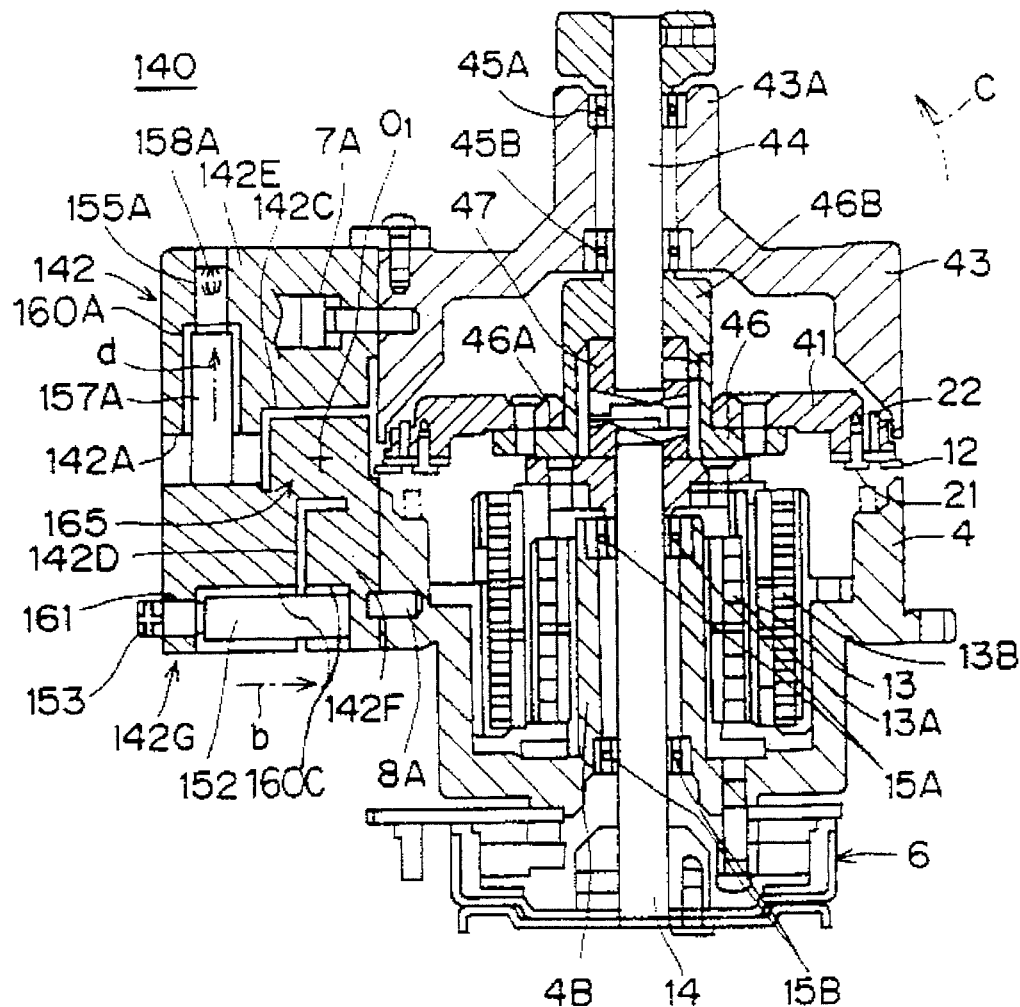
FIG. 14 is a sectional view of a central rotary drum apparatus according to a third embodiment of the present invention.

In FIG. 14, a fixed upper drum 43 is fastened to a support material 142 with a screw 7A. A cylindrical bearing holder 43A is formed in the fixed upper drum 43, and a rotary shaft 44 is supported in free rotation through bearings 45A and 45B held within the bearing holder 43A.

Figure 15:
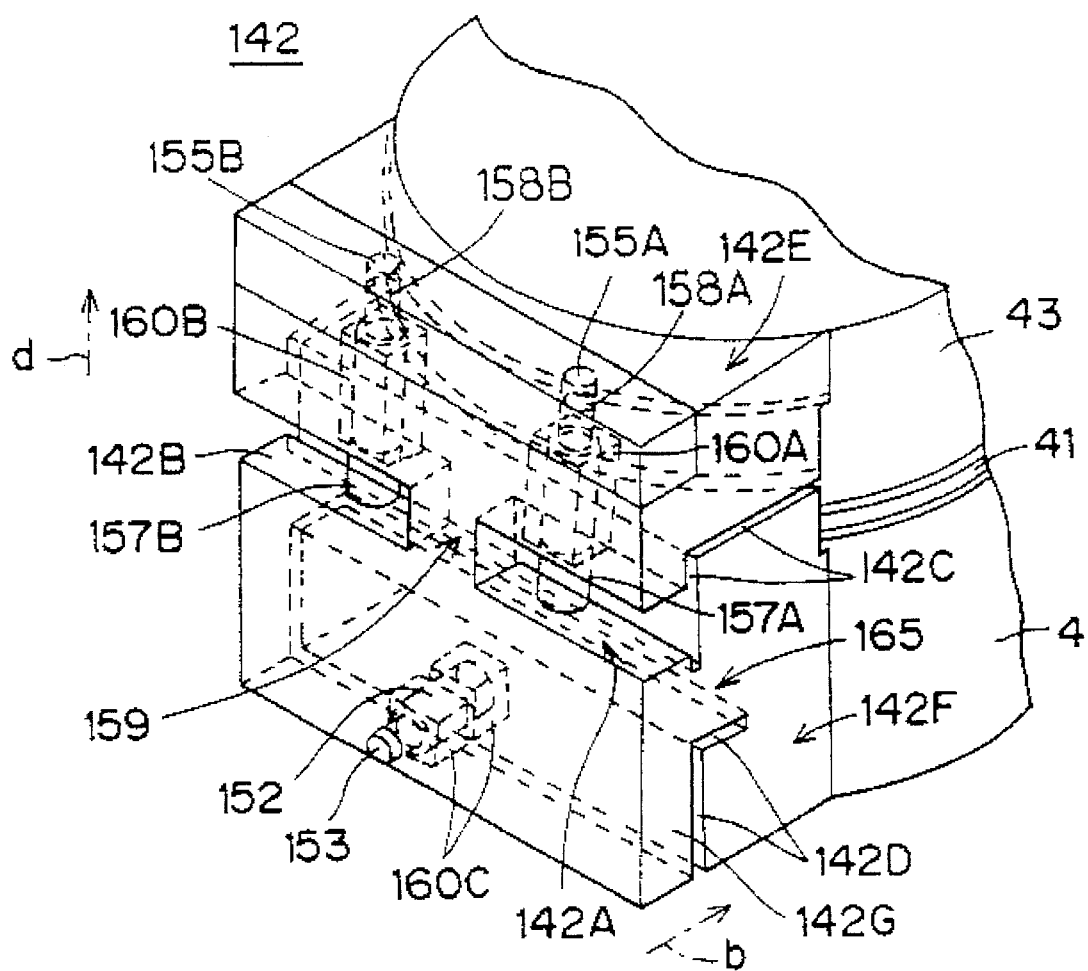
FIG. 15 is a perspective view of the central rotary drum apparatus of FIG. 14 showing the structure of a support material.

Two slits 142C and 142D are formed in a support material 142 supporting the fixed upper drum 43 and the fixed lower drum 4. Additionally, as shown in FIG. 15, notches 142A and 142B are formed through the slit 142C.

The support material 142 is divided into an upper drum fixing block 142E supporting the fixed upper drum 43 and a lower drum fixing block 142F supporting the fixed lower drum 4. The upper drum fixing block 142E and the lower drum fixing block 142F are connected through a connection 159 formed between notches 142A and 142B.

A support hole 160A is formed vertically at the top of the notch 142A, and a cylindrical piezoelectric actuator 157A is installed in the support hole 160A. The lower edge of this piezoelectric actuator 157A contacts the bottom of the notch 142A, and the top edge of the piezoelectric actuator 157A contacts a screw 158A inserted into the screw hole 155A. The piezoelectric actuator 157A is fixed between the bottom of the notch 142A and the screw 158A.

In addition, a support hole 160B is formed vertically at the top of the notch 142B, and a cylindrical piezoelectric actuator 157B is installed in the support hole 160B. The lower edge of this piezoelectric actuator 157B contacts the bottom of the notch 157B, and the top edge of the piezoelectric actuator 157B contacts a screw 158B inserted into the screw hole 155B. The piezoelectric actuator 157B is fixed between the bottom of the notch 142B and the screw 158B.

The piezoelectric actuators 157A and 157B can expand and shrink corresponding to each applied voltage value in a longitudinal direction (the direction same as or opposite to the arrow "d"). Thus, on the one hand, an upper drum fixing block 142E inclines in the direction shown by the arrow "a" centering the fulcrum $0_2$ of a connection 159, by shrinking the piezoelectric actuator 157A and simultaneously expanding the piezoelectric actuator 157B, as shown in FIG. 15. The voltage applied to each of the piezoelectric actuators 157A and 157B is controlled as described below.

On the other hand, the upper drum fixing block 142E inclines in the direction opposite to the arrow "a" (FIG. 17), centering the fulcrum $0_2$ of the connection 159, by expanding the piezoelectric actuator 157A and simultaneously shrinking the piezoelectric actuator 157B.

Figure 17:
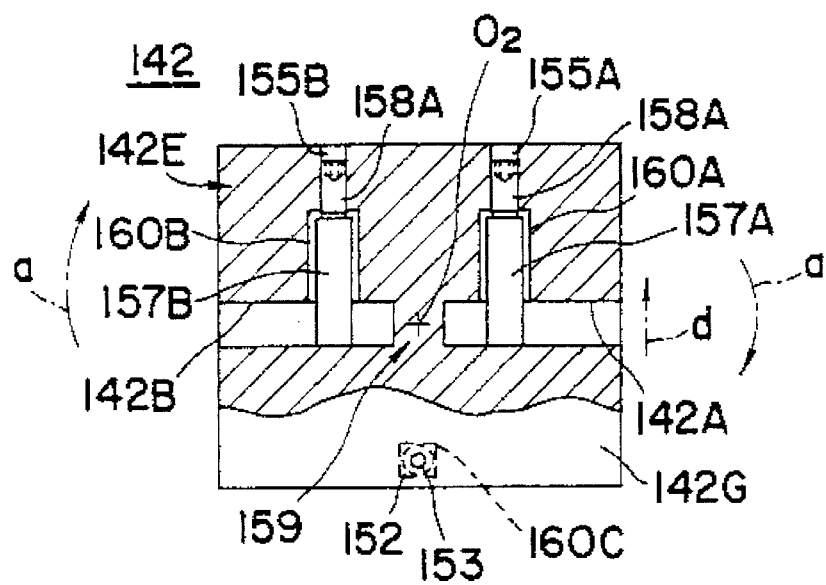
FIG. 17 is a side view of the central rotary drum apparatus of FIG. 14 showing the structure of the support material.
Figure 18C:
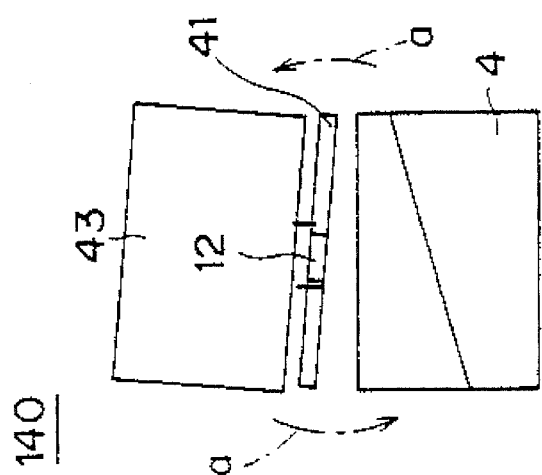
FIG. 18 is a schematic diagram describing the azimuth adjustment of a magnetic head locus in the third embodiment.
Figure 18B:
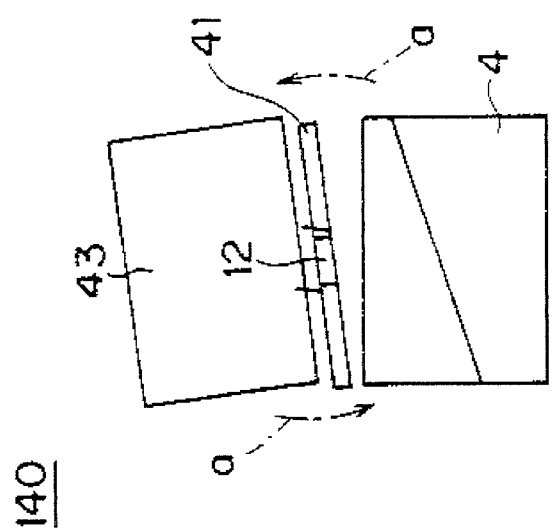
Figure 18A:
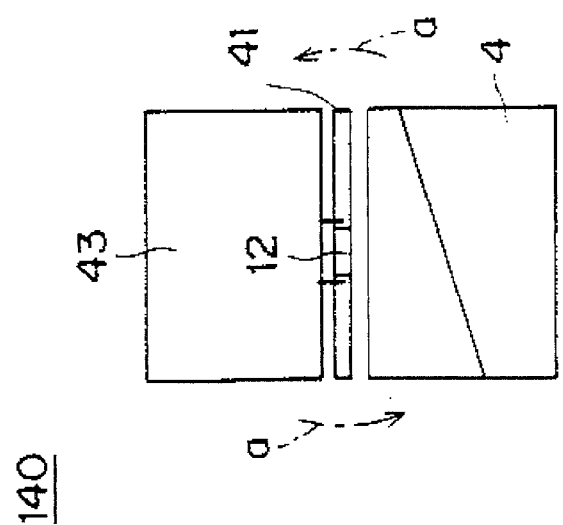

As shown in FIG. 18, where the support material 142 in FIG. 17 is seen as the rotary drum apparatus 140 from the back, if the piezoelectric actuators 157A and 157B incline the upper drum fixing block 142E (FIG. 17) in the direction of the arrow "a" from a horizontal state of the fixed upper drum 43 (FIG. 18(A)), the fixed upper drum 43 fixed to the fixing block 142E inclines in the direction of the arrow "a" (FIG. 18(B)). The central rotary drum 41 unified with the rotary shaft 44 of the fixed upper drum 43 (FIG. 14) also inclines in the direction of the arrow "a" with the fixed upper drum 43. Consequently, the locus of the magnetic head 12 fixed to the central rotary drum 41 can be inclined in relation to a magnetic tape (not shown) contacting the outer circumference of the fixed upper drum 43 and the fixed lower drum 4.

In addition, if the piezoelectric actuators 157A and 157B incline the upper drum fixing block 142E (FIG. 17) in the direction opposite to the arrow "a" the fixed upper drum 43 fixed to the fixing block 142E inclines in the direction opposite to the arrow "a" (FIG. 18(C)). Thus, the central rotary drum 41 unified with the rotary shaft 44 of the fixed upper drum 43 (FIG. 14) inclines in the direction opposite to the arrow "a" with the fixed upper drum 43. Consequently, the locus of the magnetic head 12 fixed to the central rotary drum 41 can be inclined in relation to a magnetic tape (not shown) contacting the outer circumference of the fixed upper drum 43 and the fixed lower drum 4.

The locus of the magnetic head 12 in relation to the magnetic tape can be inclined in the azimuth direction by adjusting the length of the piezoelectric actuators 157A and 157B (FIG. 17)) with applied voltages in the manner described above. Incidentally, this adjustment in the azimuth direction is also called adjustment of the horizontal degree.

Furthermore, in FIG. 15, the support material 142 is divided into a lower drum fixing block 142F supporting the fixed lower drum 4 and a vertical adjustment block 142G connected to an upper drum fixing block 142E supporting the fixed upper drum 43 with the vertical slit 142D through the connection 165.

A support hole 160C opened to the lower drum fixing block 142F is formed in the vertical adjustment block 142G, and a piezoelectric actuator 152 is held in the support hole 160C with a screw 153 inserted into a screw hole 161. The piezoelectric actuator 152 can expand and shrink by controlling the voltage applied to the piezoelectric actuator 152.

Thus, the vertical adjustment block 142G can be displaced in the closer direction (the direction of an arrow "b") in relation to the lower drum fixing block 142F, by expanding the piezoelectric actuator 152. The vertical adjustment block 142G can also be displaced in the more distant direction (the direction opposite to the arrow "b") in relation to the lower drum fixing block 142F, through shrinking the piezoelectric actuator 152.

Thus, on the one hand, if the vertical adjustment block 142G is displaced in the direction of the arrow "b" in relation to the lower drum fixing block 142F by the piezoelectric actuator 152, as shown in FIG. 14, the fixed upper drum 43 can be displaced through the upper drum fixing block 142E connected to the vertical adjustment block 142G. The displacement direction of the fixed upper drum 43 is the direction of the arrow "c" centering the fulcrum $0_1$ of the connection 165 of the support material 142.

On the other hand, if the vertical adjustment block 142G is displaced in the direction opposite to the arrow "b" in relation to the lower drum fixing block 142F by the piezoelectric actuator 152, the fixed upper drum 43 can be displaced through the upper drum fixing block 142E connected to the vertical adjustment block 142G. The displacement direction of the fixed upper drum 43 is the direction opposite to the arrow "c" centering the fulcrum $0_1$ of the connection 165 of the support material 142.

Figure 19C:
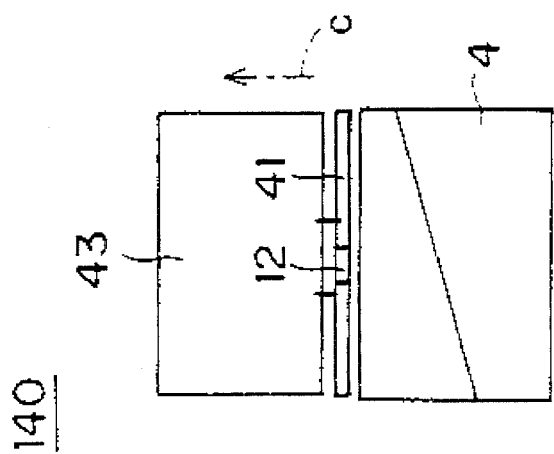
FIG. 19 is a schematic diagram describing the vertical adjustment of a magnetic head locus in the third embodiment.
Figure 19B:
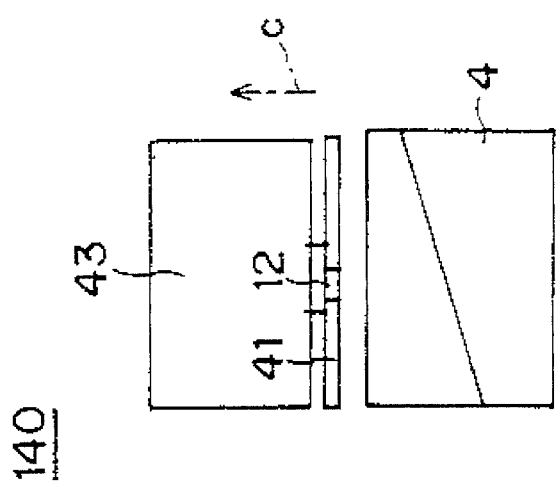
Figure 19A:
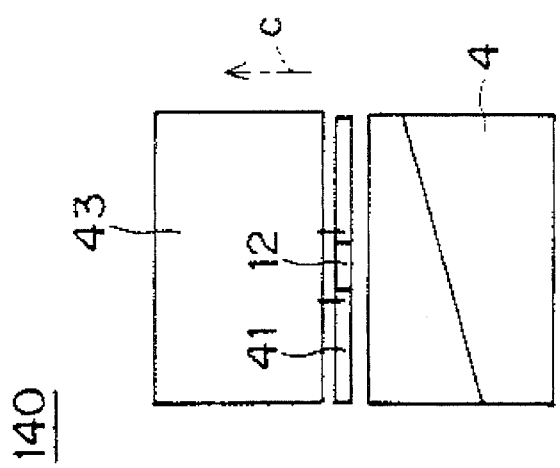

As shown in FIG. 19, where the support material 142 (FIGS. 16 and 17) is seen as the rotary drum apparatus 40 from the back, if the fixed upper drum 43 is displaced in the direction of the arrow "c" (FIG. 19(B)) by the piezoelectric actuator 152 in a horizontal state (FIG. 19(A)), the central rotary drum 41 unified with the rotary shaft 44 of the fixed upper drum 43 (FIG. 14) inclines in the direction of the arrow "c." Consequently, the locus of the magnetic head 12 fixed to the central rotary drum 41 can be inclined upward in relation to a magnetic tape (not shown) contacting the outer circumference of the fixed upper drum 43 and the fixed lower drum 4.

Furthermore, if the fixed upper drum 43 is displaced in the direction opposite to the arrow "c" (FIG. 19(C)) through the piezoelectric actuator 152 in the horizontal state (FIG. 19(A)), the central rotary drum 41 unified with the rotary shaft 44 of the fixed upper drum 43 (FIG. 14) inclines in the direction opposite to the arrow "c" with the fixed upper drum 43, and consequently, the locus of the magnetic head 12 fixed to the central rotary drum 41 can be inclined downward in relation to a magnetic tape (not shown) contacting the outer circumference of the fixed upper drum 43 and the fixed lower drum 4.

The locus of the magnetic head 12 can be moved upward and downward (vertical direction) in parallel in relation to the magnetic tape by adjusting the length of the piezoelectric actuator 152. Incidentally, this adjustment in the vertical direction is also called adjustment of the vertical displacement degree.

Figure 20:
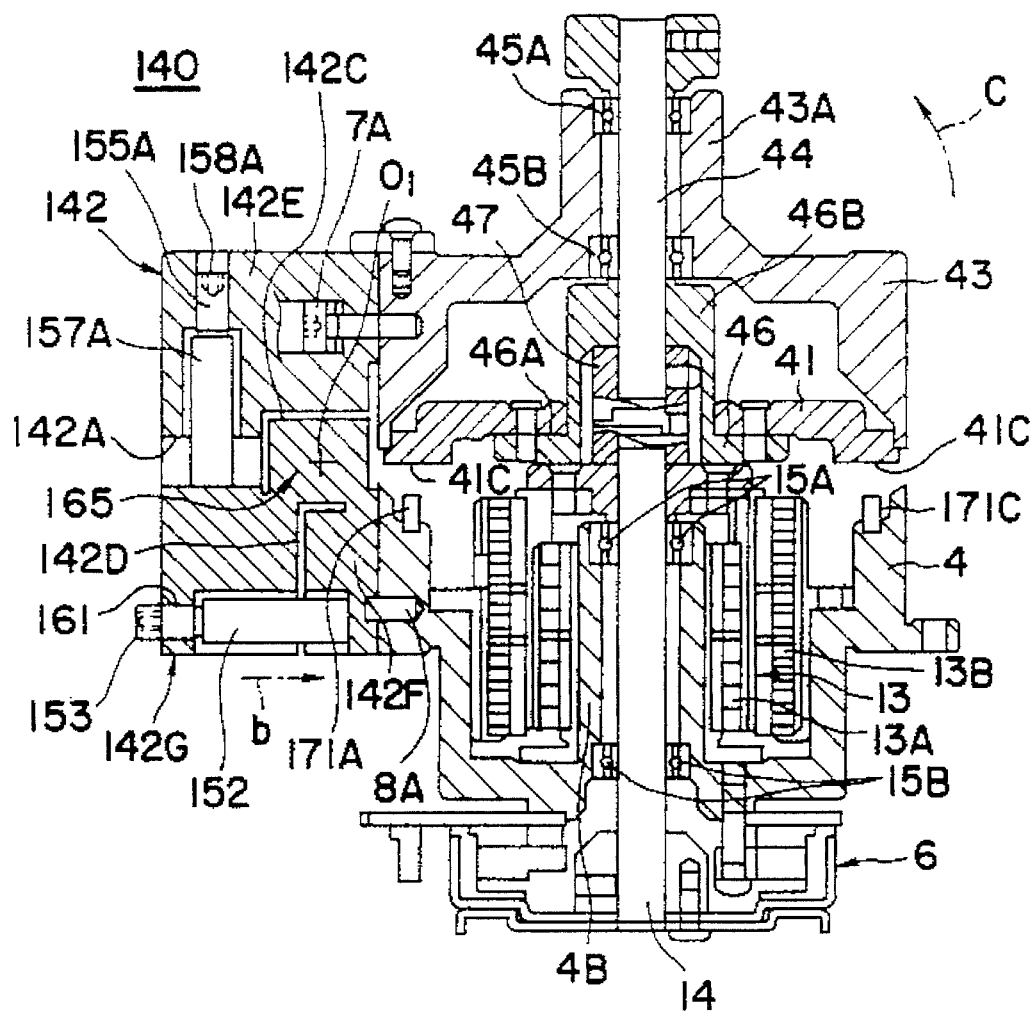
FIG. 20 is a sectional view of the third embodiment showing the layout of distance sensors.

As shown in FIG. 20, a lower side 41C of the central rotary drum 41 of the rotary drum apparatus 140 is made mirror-finished, and a distance sensor 171C is fixed at the position of the fixed lower drum 4, which is opposite to the lower side 41C. The distance sensor 171C comprises a laser diode irradiating laser light to the lower side 41C of the central rotary drum 41 and a light receiver receiving the light reflected from the lower side 41C and detecting the 20 distance between the distance sensor 171C and the lower side 41C corresponding to the light receiving position. The distance sensor sends a detection output comprising voltage levels corresponding to the receiving position of the reflected laser light (namely, the distance to the lower side 41C) to a controller.

Figure 16:
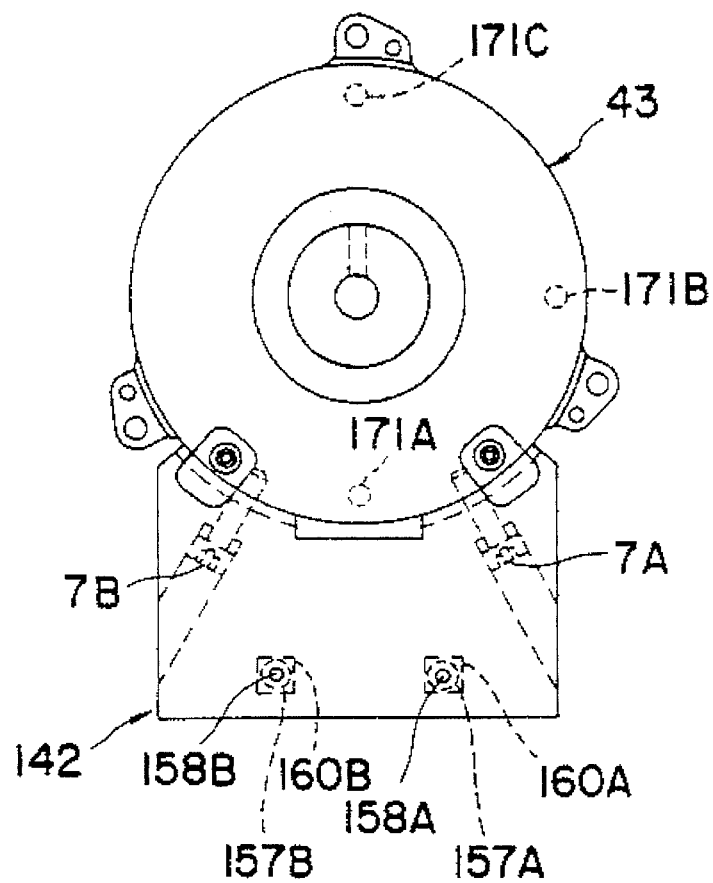
FIG. 16 is a top view of the central rotary drum apparatus of FIG. 14 showing the structure of the support material.

In the rotary drum apparatus 140, distance sensors 171A and 171B in the same structure as the distance sensor 171C are fixed. As shown in FIG. 16, the distance sensors 171A and 171C are disposed on the line passing through the rotation center of the central rotary drum 41 (namely, the rotary shaft 44), and the distance sensor 171B is disposed at a position 90 degrees apart from the distance sensors 171A and 171C.

Since there is a connection 159 of the support material 142 on the line passing the distance sensors 171A and 171C, as shown in FIG. 15, detection outputs of the distance sensors 171A and 171C do not change when an azimuth adjustment of the central rotary drum 41 is made with the piezoelectric actuators 157A and 157B and the central rotary drum 41 is displaced in the azimuth direction. However, detection outputs of the distance sensors 171A and 171C change when a vertical adjustment of the central rotary drum 41 is done with the piezoelectric actuators 152 and the central rotary drum 41 displaced in a vertical direction.

In addition, a detection output of the distance sensor 171B changes when an azimuth adjustment of the central rotary drum 41 is done and the central rotary drum 41 is displaced in a vertical direction.

Thus, only the displacement of the central rotary drum 41 in the vertical direction can be detected with the detection outputs of the distance sensors 171A and 171C, and only the displacement of the central rotary drum 41 in the azimuth direction (namely, the horizontal degree) can be detected with the detection output of the distance sensor 171B.

Figure 21:
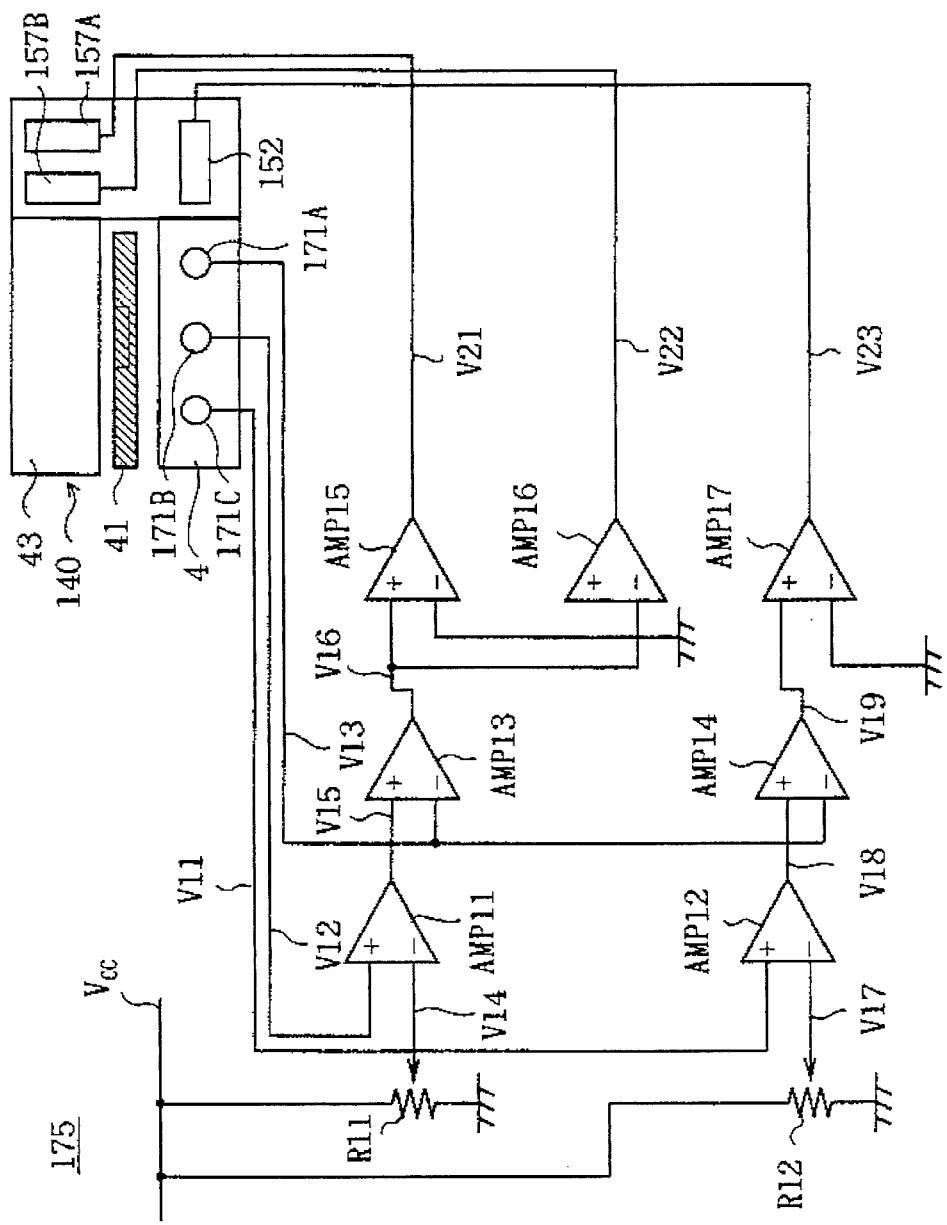
FIG. 21 is a block diagram showing the structure of a piezoelectric actuator control circuit for the third embodiment.

FIG. 21 shows a piezoelectric actuator control circuit 175 controlling each voltage applied to each of the piezoelectric actuators 152, 157A and 157B, based on the detection outputs of the distance sensors 171A, 171B, and 171C. A detection output V11 output from the distance sensor 171C is input to a noninverted input terminal of a control amplifier AMP14 through a sensor amplifier AMP12.

The control amplifier AMP14 inputs a differential voltage between the detection outputs of the distance sensors 171A and 171C as an error voltage V19 to a noninverted input terminal of a voltage driver AMP17 by inputting the detection output V13 of the distance sensor 171A to an inverted input terminal.

As the voltage driver AMP17 outputs a driving voltage V23 making the differential voltage between the detection outputs of the distance sensors 171A and 171C zero to the piezoelectric actuator 152 of the support material 142, the piezoelectric actuator 152 expands or shrinks corresponding to the drive voltage V23. Because feedback is available, which makes an output of the distance sensor 171C coincide with an output of the distance sensor 171A, based on the height of the distance sensor 171A nearest to the movable fulcrum $0_1$ (FIG. 20) in the vertical direction, a vertical adjustment (adjustment of a vertical displacement degree) of the central rotary drum 41 can be done.

Moreover, on the one hand, in the case of inclining the central rotary drum 41 in the vertical direction, because an offset voltage V17 is input to an inverted input terminal of the sensor amplifier AMP12 through a variable resistor R12 from the source voltage Vcc, and the differential voltage V18 between a detection output V11 of the distance sensor 171C and the offset voltage V17 is output to the control amplifier AMP14, inclination of the central rotary drum 41 in the vertical direction determined with the offset voltage V17 can be given by the piezoelectric actuator 152.

On the other hand, a detection output V12 output by a distance sensor 171B is input to a noninverted input terminal of a control amplifier AMP13 through a sensor amplifier AMP11.

The control amplifier AMP13 inputs the differential voltage between detection outputs of the distance sensors 171A and 171C as an error voltage V16 to a noninverted input terminal of a voltage driver AMP15 and an inverted input terminal of a voltage driver AMP16 by inputting the detection output V13 of the distance sensor 171A to an inverted input terminal.

The voltage drivers AMP15 and AMP16 move either of the piezoelectric actuators 157A and 157B in the expanding direction and move the other in the shrinking direction through a differential operation against the error voltage V16. Because feedback is available, an output of the distance sensor 171B can be made to coincide with an output of the distance sensor 171A, based on the height of the distance sensor 171A nearest to the movable fulcrum $0_2$ (FIG. 17) in the azimuth direction. Thus, an azimuth adjustment (adjustment of the horizontal degree) of the central rotary drum 41 can be done accurately.

Moreover, in the case of inclining the central rotary drum 41 in the azimuth direction, because an offset voltage V14 is input to an inverted input terminal of the sensor amplifier AMP11 through a variable resistor R11 from the source voltage Vcc, and the differential voltage V15 between a detection output V12 of the distance sensor 171B and the offset voltage V14 is output to the control amplifier AMP13, inclination of the central rotary drum 41 determined with the offset voltage V15 can be given by the piezoelectric actuator 157A and 157B.

If an assembly error occurs due to dirt when the fixed upper drum 43 is fastened to the support material 142, this apparatus can vertically adjust displacement of the fixed upper drum 43 and the central rotary drum 41, because the piezoelectric actuator control circuit 175 expands and shrinks the piezoelectric actuator 152, based on the detection outputs of the distance sensors 171A and 171C.

Moreover, this apparatus can adjust the inclination of the fixed upper drum 43 and the central rotary drum 41 in the azimuth direction, because the piezoelectric actuator control circuit 175 makes the piezoelectric actuators 157A and 157B operate differentially, based on the detection outputs of the distance sensors 171A and 171B.

Thus, this apparatus can perform control to always make the distance of the lower side 41C of the central rotary drum 41 coincide with the fixed lower drum 4 through the piezoelectric actuator control circuit 175.

Incidentally, in FIG. 21, because this apparatus can input the offset voltages V14 and V17 to the sensor amplifiers AMP11 and AMP12 and can adjust displacement of the rotation locus of the magnetic head 12 optionally in the azimuth and vertical directions, the apparatus can easily perform variable-speed reproducing without using a conventional type of complicated structure of bimorph, and so forth. This can be done by performing program control that changes the offset voltages V14 and V17 corresponding to a change in the magnetic tape speed in the case of slow reproducing or double-speed reproducing.

Although the third embodiment (FIGS. 14 to 21) of the present invention is described in conjunction with a central rotary drum apparatus 140, it can be also applied to an upper rotary drum apparatus having a rotating upper drum.

Furthermore, although the third embodiment of the present invention has been described as using laminated ceramic structure of the piezoelectric actuator 152, 157A, and 157B, the present invention is not limited to this structure. It is possible that each gap of slits 142C and 142D can be changed with a small motor, and so forth.

The above embodiments of the present invention have been described with a structure for rotating the rotary shaft 44 connected to the rotary shaft 14 with a flexible joint 47 through the drive motor 6 rotating the rotary shaft 14 supported within the fixed lower drum 4. However, the present invention is not limited to this structure. It is possible that the rotary shafts 14 and 44 can be driven synchronously with two motors.

Furthermore, although the above embodiments of the present invention are described for use with a rotary drum apparatus in a video tape recorder, the present invention can also be applied to various other types of rotary drum apparatus, such as a rotary drum apparatus in an audio tape recorder performing the recording and reproducing of digital audio signals, and so forth.

EFFECTS OF THE INVENTION

According to the present invention, a first rotary shaft holding material fixed to a predetermined support material supports a first rotary shaft in free rotation, a second rotary shaft holding material fixed to a predetermined support material supports a second rotary shaft in free rotation, a flexible joint connects the first rotary shaft and second rotary shaft, and the head of a rotary drum connected to the first rotary shaft can be rotated by rotating the second rotary shaft with a predetermined drive means.

As mentioned above, a locus of the head on the rotary drum connected to the first rotary shaft can be adjusted to coincide with the predetermined locus by dividing the rotary shaft into two and adjusting the horizontal degree and vertical degree of the rotary shaft holding material supporting the first rotary shaft by the adjustment means based on the results measured with the measuring means.

Thus, in the case of head replacement, it is possible to cause the loci of the head to coincide before and after replacement through the replacement of an entire first rotary shaft holding material, including the rotary drum fixed to the first rotary shaft.

It will be appreciated that the present invention is not limited to the exact construction which has been described above and illustrated in the accompanying drawings, and that various modifications and changes can be made without departing from the scope thereof. It is intended that the scope of the invention only be limited by the appended claims.

We claim:

1. A rotary drum apparatus for recording and/or reproducing predetermined signals on a tape recording medium through the rotation of a head fixed on a rotary drum, comprising:

a support arrangement including a connection member integrally interconnecting a first rotary shaft support member and a second rotary shaft support member;

a first rotary shaft rotatably supported by the first rotary shaft support member;

a second rotary shaft rotatably supported by the second rotary shaft supporting member in a predetermined spatial relation to said first rotary shaft;

synchronization means for causing the rotation of said first rotary shaft to coincide with the rotation of said second rotary shaft;

said rotary drum being fixed to said first rotary shaft and supporting said head; and adjustment means for adjusting a horizontal displacement degree and a vertical displacement degree of said first rotary shaft support member for adjusting the rotation locus of said head, said adjustment means including means defining elongate voids in said interconnection member for enabling the first support member to be selectively inclined with respect to the second support member by predetermined adjustment devices.

2. The rotary drum apparatus according to claim 1, wherein said synchronization means comprises a flexible joint connecting said first rotary shaft and said second rotary shaft.

3. A rotary drum apparatus for recording and/or reproducing predetermined signals on a tape recording medium through the rotation of a head fixed on a rotary drum, comprising:

a support material fastening a first rotary shaft holding material and a second rotary shaft holding material;

a first rotary shaft supported in free rotation by the first rotary shaft holding material;

a second rotary shaft supported in free rotation by the second rotary shaft holding material and being divided in relation to said first rotary shaft;

a synchronization means for causing the rotation of said first rotary shaft to coincide with the rotation of said second rotary shaft;

said rotary drum being fixed to said first rotary shaft and supporting said head; and an adjustment means for adjusting a horizontal displacement degree and a vertical displacement degree of said first rotary shaft holding material for adjusting the rotation locus of said head, wherein:

said adjustment means vertically adjusts the displacement of said first rotary shaft holding material by dividing said support material into a first block fastening said first rotary shaft holding material and a second block fastening said second rotary shaft holding material with a first slit formed in a direction vertical to a surface formed with the rotation locus of said head, and changing the gap of said first slit; and said adjustment means horizontally adjusts the inclination of said first rotary shaft holding material by dividing the support material into a first block fastening said first rotary shaft holding material and a second block fastening said second rotary shaft holding material with a second slit formed in a direction horizontal to a surface formed with the rotation locus of said head, and changing the gap of said second slit.

4. A rotary drum apparatus for recording and/or reproducing predetermined signals on a tape recording medium through the rotation of a head fixed on a rotary drum, comprising:

a support material fastening a first rotary shaft holding material and a second rotary shaft holding material;

a first rotary shaft supported in free rotation by the first rotary shaft holding material;

a second rotary shaft supported in free rotation by the second rotary shaft holding material and being divided in relation to said first rotary shaft;

a synchronization means for causing the rotation of said first rotary shaft to coincide with the rotation of said second rotary shaft;

said rotary drum being fixed to said first rotary shaft and supporting said head;

an adjustment means for adjusting a horizontal displacement degree and a vertical displacement degree of said first rotary shaft holding material for adjusting the rotation locus of said head; and measuring means for measuring the distance between said first rotary shaft holding material and said rotary drum at least three points along a circumference of said rotary drum.

5. The rotary drum apparatus according to claim 4, wherein said adjustment means adjusts a horizontal displacement degree and a vertical displacement degree of said first rotary shaft holding material based on measurement results of said measuring means.

6. A rotary drum apparatus for recording and/or reproducing predetermined signals on a tape recording medium, comprising:

a support structure having a first rotary shaft support member and a second rotary shaft support member;

a first rotary shaft supported for free rotation in the first rotary shaft support member;

a second rotary shaft supported for free rotation in the second rotary shaft support member;

a synchronization means for synchronizing the rotation of said first rotary shaft with the rotation of said second rotary shaft;

a rotary drum being fixed to said first rotary shaft;

a magnetic head mounted to said rotary drum; and adjustment means included in a portion of said support structure which interconnects the first rotary shaft support member and the second rotary shaft support member for adjusting a rotation locus of said magnetic head by adjusting a horizontal displacement degree and a vertical displacement degree of said first rotary shaft holding member with respect to said second rotary shaft holding member, said adjustment means including elongate voids which are formed in the portion of said support structure which interconnects the first rotary shaft support member and the second rotary shaft support member, said voids allowing the first rotary shaft support member to be selectively inclined with respect to the second rotary shaft support member and therefore allow said first rotary shaft to be angularly adjusted with respect to said second rotary shaft.

7. The rotary drum apparatus according to claim 6, wherein said synchronization means comprises a flexible joint connecting said first rotary shaft and said second rotary shaft.

8. A rotary drum apparatus for recording and/or reproducing predetermined signals on a tape recording medium, comprising:

a support structure having a first rotary shaft holding member and a second rotary shaft holding member;

a first rotary shaft supported in free rotation by the first rotary shaft holding member;

a second rotary shaft supported in free rotation by the second rotary shaft holding member, said second rotary shaft being angularly adjustable with respect to said first rotary shaft;

a synchronization means for synchronizing the rotation of said first rotary shaft with the rotation of said second rotary shaft;

a rotary drum being fixed to said first rotary shaft;

a magnetic head mounted to said rotary drum; and an adjustment means for adjusting a rotation locus of said magnetic head by adjusting a horizontal displacement degree and a vertical displacement degree of said first rotary shaft holding member with respect to said second rotary shaft holding member;

wherein said adjustment means vertically adjusts the displacement of said first rotary shaft holding member by changing a gap of a first slit in said support structure by a first actuator, and horizontally adjusts the inclination of said first rotary shaft holding member by changing a gap of a second slit in said support structure by a second actuator.

9. A rotary drum apparatus for recording and/or reproducing predetermined signals on a tape recording medium, comprising:

a support structure having a first rotary shaft holding member and a second rotary shaft holding member;

a first rotary shaft supported in free rotation by the first rotary shaft holding member;

a second rotary shaft supported in free rotation by the second rotary shaft holding member, said second rotary shaft being angularly adjustable with respect to said first rotary shaft;

a synchronization means for synchronizing the rotation of said first rotary shaft with the rotation of said second rotary shaft;

a rotary drum being fixed to said first rotary shaft;

a magnetic head mounted to said rotary drum; and an adjustment means for adjusting a rotation locus of said magnetic head by adjusting a horizontal displacement degree and a vertical displacement degree of said first rotary shaft holding member with respect to said second rotary shaft holding member;

wherein: said adjustment means adjusts the horizontal displacement degree of said rotary shaft holding member in response to two measured results of first and second distance sensors for measuring the horizontal displacement degree of said first rotary shaft holding member, and also adjusts the vertical displacement degree of said first rotary shaft holding member in response to two measured results of said first distance sensor and a third distance sensor for measuring the vertical displacement degree of said first rotary shaft holding member.

10. A rotary drum apparatus for recording and/or reproducing predetermined signals on a tape recording medium, comprising:

a support structure having a first rotary shaft holding member and a second rotary shaft holding member;

a first rotary shaft supported in free rotation by the first rotary shaft holding member;

a second rotary shaft supported in free rotation by the second rotary shaft holding member, said second rotary shaft being angularly adjustable with respect to said first rotary shaft;

a synchronization means for synchronizing the rotation of said first rotary shaft with the rotation of said second rotary shaft;

a rotary drum being fixed to said first rotary shaft;

a magnetic head mounted to said rotary drum;

an adjustment means for adjusting a rotation locus of said magnetic head by adjusting a horizontal displacement degree and a vertical displacement degree of said first rotary shaft holding member with respect to said second rotary shaft holding member; and measuring means for measuring the distance between said first rotary shaft holding member and said rotary drum at least three points along a circumference of said rotary drum.

11. The rotary drum apparatus according to claim 10, wherein said adjustment means adjusts a horizontal displacement degree and a vertical displacement degree of said first rotary shaft holding member based on measurement results of said measuring means.

12. A rotary drum apparatus according to claim 1, wherein said predetermined adjustment devices comprise manually adjustable screws.

13. A rotary drum apparatus according to claim 1, wherein said predetermined adjustment devices comprise piezoelectric actuators, said piezoelectric actuators being arranged with said elongate voids so that force may be selectively applied in a manner which induces the inclination of said first support member with respect to said second support member.

14. A rotary drum apparatus according to claim 13, further comprising sensor means operatively arranged with said first rotary shaft support member and said second rotary shaft support member and controllably connected with said piezoelectric actuators for controlling a voltage supplied to said piezoelectric elements by a control circuit responsive to signals produced by said sensor means.

* * * * *